(12) United States Patent
Shao et al.

(10) Patent No.: US 9,965,843 B2
(45) Date of Patent: *May 8, 2018

(54) METHODS AND SYSTEMS FOR CHARACTERIZING CONCEPT DRAWINGS AND ESTIMATING THREE-DIMENSIONAL INFORMATION THEREFROM

(71) Applicants: The University of British Columbia, Vancouver (CA); The Governing Council of the University of Toronto, Toronto (CA); Institut National de Recherche en Informatique et en Automatique (Inria), Le Chesnay (FR)

(72) Inventors: Cloud Yunfei Shao, Burnaby (CA); Adrien Bousseau, Courlay (FR); Alla Sheffer, Vancouver (CA); Karansher Singh, Toronto (CA)

(73) Assignees: The University of British Columbia, Vancouver (CA); The Governing Councel of the University of Toronto, Toronto (CA); Institut National de Recherche en Informatique et en Automatique (Inria), Le Chesnay (FR)

( * ) Notice: Subject to any disclaimer, the term of this patent is extended or adjusted under 35 U.S.C. 154(b) by 14 days.

This patent is subject to a terminal disclaimer.

(21) Appl. No.: 15/201,082

(22) Filed: Jul. 1, 2016

(65) Prior Publication Data
US 2016/0335758 A1 Nov. 17, 2016

Related U.S. Application Data

(63) Continuation of application No. 14/273,321, filed on May 8, 2014, now Pat. No. 9,405,594.

(Continued)

(51) Int. Cl.
*G06T 7/00* (2017.01)
*G06T 7/543* (2017.01)
(Continued)

(52) U.S. Cl.
CPC ........ *G06T 7/0004* (2013.01); *G06K 9/00476* (2013.01); *G06K 9/224* (2013.01);
(Continued)

(58) Field of Classification Search
None
See application file for complete search history.

(56) References Cited

U.S. PATENT DOCUMENTS

| 7,239,314 B2 | 7/2007 | Johnston |
| 2003/0053697 A1* | 3/2003 | Aylward ............... G06T 7/0012 382/203 |

(Continued)

OTHER PUBLICATIONS

Xu, Baoxuan, et al. "True2Form: 3D curve networks from 2D sketches via selective regularization." ACM Transactions on Graphics 33.4 (2014).*

(Continued)

*Primary Examiner* — Kim Vu
*Assistant Examiner* — Nathan Bloom
(74) *Attorney, Agent, or Firm* — Chernoff Vilhauer, LLC

(57) ABSTRACT

Methods for characterizing two-dimensional concept drawings are disclosed. The concept drawings comprise cross-sections intersecting at cross-hairs. The method comprises: determining, for each cross-section: a plane on which the cross-section is located, the plane having a normal vector in a three-dimensional coordinate system; and, for each cross-hair on the cross-section, a tangent vector in the three-dimensional coordinate system which is tangent to the cross-section at the cross-hair. For each cross-hair comprising $i^{th}$ and $j^{th}$ intersecting cross-sections, one or more con- (Continued)

straints are satisfied, the constraints comprising: the normal vector $n_i$ of the plane on which the $i^{th}$ cross-section is located is at least approximately orthogonal to the normal vector $n_j$ of the plane on which the $j^{th}$ cross-section is located; and the tangent vector $t_{ij}$ to the $i^{th}$ cross-section at the cross-hair is at least approximately orthogonal to the tangent vector $t_{ji}$ to the $j^{th}$ cross-section at the cross-hair.

20 Claims, 6 Drawing Sheets

Related U.S. Application Data

(60) Provisional application No. 61/829,864, filed on May 31, 2013, provisional application No. 61/821,152, filed on May 8, 2013.

(51) Int. Cl.
*G06T 7/60* (2017.01)
*G06T 11/20* (2006.01)
*G06T 17/10* (2006.01)
*G06K 9/00* (2006.01)
*G06K 9/22* (2006.01)
*G06K 9/48* (2006.01)
*G06K 9/52* (2006.01)

(52) U.S. Cl.
CPC ............... *G06K 9/481* (2013.01); *G06K 9/52* (2013.01); *G06T 7/543* (2017.01); *G06T 7/60* (2013.01); *G06T 11/203* (2013.01); *G06T 17/10* (2013.01); *G06T 2210/21* (2013.01); *G06T 2219/008* (2013.01)

(56) References Cited

U.S. PATENT DOCUMENTS

| | | |
|---|---|---|
| 2006/0274063 A1 | 12/2006 | Grandine et al. |
| 2008/0024500 A1* | 1/2008 | Bae ..................... G06T 11/203 345/442 |
| 2008/0246762 A1 | 10/2008 | Ogata et al. |
| 2010/0220099 A1 | 9/2010 | Maekawa et al. |
| 2014/0229143 A1 | 8/2014 | Cohen-Or et al. |

OTHER PUBLICATIONS

Ecker, A., 2010. Linear, Discrete, and Quadratic Constraints in Single-image 3D Reconstruction (Doctoral dissertation).*
Jen-Hui Chuang, Narendra Ahuja, Chien-Chou Lin, Chi-Hao Tsai, Cheng-Hui Chen, A potential-based generalized cylinder representation, In Computers & Graphics, vol. 28, Issue 6, 2004, pp. 907-918, ISSN 0097-8493.*
Shao et al., "CrossShade: Shading Concept Sketches Using Cross-Section Curves", published online Jun. 1, 2012.
Andre et al., "Single-view sketch based modeling", 2011, In Proc. Symp. on Sketch-Based Interfaces and Modeling.
Andre et al., "Crosssketch: freeform surface modeling with details", 2007. In Proc. Symp. on Sketch-Based Interfaces and Modeling, 45-52.
Bae et al., "ILoveSketch: as-natural-as-possible sketching system for creating 3d curve models", 2008, In Proc. User Interface Software and Technology.
Biard et al., "Construction of rational surface patches bounded by lines of curvature", 2010, Comput. Aided Geom. Des. 27, 359-371.
Cole et al., "How well do line drawings depict shape?", 2009, ACM Trans. on Graph. (Proc. of SIGGRAPH) 28, 3.
Ecker et al., "Shape from planar curves: A linear escape from flatland", 2007, In IEEE Computer Vision and Pattern Recognition.
Farin et al., "Discrete coons patches", 1999, Computer Aided Geometric Design 16 (August), 691-700.
Finch et al., "Freeform vector graphics with controlled thin-plate splines", 2011, ACM Trans. on Graph. (Proc. SIGGRAPH Asia) 30.
Gangnet et al., "Incremental computation of planar maps", 1989, SIGGRAPH 23 (July), 345-354.
Gingold et al., "Structured annotations for 2D-to-3D modeling", 2009, ACM Trans. on Graph. (Proc. SIGGRAPH Asia) 28, 5.
Gooch et al., "A non-photorealistic lighting model for automatic technical illustration", 1998, SIGGRAPH, 447-452.
Igarashi et al., "Teddy: a sketching interface for 3d freeform design", 1999, SIGGRAPH.
Johnston, S. F., "Lumo: illumination for cel animation", 2002, In Proc. Symp. on Non-Photorealistic Animation and Rendering.
Joshi, P. et al., "Repoussé: Automatic inflation of 2d artwork", 2008, In Proc. of Sketch Based Interfaces and Modeling.
Knill, D. C., Perception of surface contours and surface shape: from computation to psychophysics, 1992, Journal of Optical Society of America 9, 9, 1449-1464.
Koenderink et al., "Surface perception in pictures", 1992, Perception & Psychophysics, 487-496.
Malik, J., "Interpreting line drawings of curved objects", 1987, International Journal of Computer Vision 1, 1, 73-103.
Mamassian et al., "Observer biases in the 3D interpretation of line drawings", 1998, Vision research 38, 18, 2817-2832.
McCrae et al., "Slices: A shape-proxy based on planar sections", 2011, ACM Trans. on Graph. (Proc. SIGGRAPH Asia) 30, 6.
Nasri et al., "Filling N-Sided Regions by Quad Meshes for Subdivision Surfaces", 2009, Computer Graphics Forum 28, 6 (Sept.), 1644-1658.
Nealen et al., "Fibermesh: designing freeform surfaces with 3d curves", 2007, ACM Trans. on Graph. (Proc. SIGGRAPH) 26 (July).
Okabe et al., "Single-view relighting with normal map painting", 2006, In Proc. Pacific Graphics, 27-34.
Olsen et al., "Sketch-based modeling: A survey", 2009, Computers & Graphics 33.
Orzan et al., "Diffusion curves: A vector representation for smooth-shaded images", 2008, ACM Trans. on Graph. (Proc. SIGGRAPH) 27.
Schmidt et al., "On expert performance in 3D curve-drawing tasks", 2009, In Proc. Symp. Sketch-Based Interfaces and Modeling.
Schmidt et al., "Analytic drawing of 3d scaffolds", 2009, ACM Trans. on Graph. (Proc. SIGGRAPH Asia) 28, 5.
Stevens, K. A., "The visual interpretation of surface contours", 1981, Artificial Intelligence 17.
Sýkora et al., "Lazy-Brush: Flexible painting tool for hand-drawn cartoons", 2009, Computer Graphics Forum (Proc. Eurographics) 28, 2.
Winnemöller et al., "Texture design and draping in 2d images", 2009, Computer Graphics Forum (Proc. Symp. on Rendering) 28, 4.
Wu et al., "Shapepalettes: interactive normal transfer via sketching", 2007, ACM Trans. on Graph. (Proc. of SIGGRAPH) 26.
Zhang et al., "Single view modeling of free-form scenes", 2002, In IEEE Computer Vision and Pattern Recognition, 990-997.
Lipson et al., "Optimization-based reconstruction of a 3d object from a single freehand line drawing", 1996, Computer-Aided Design 28, 651-663.
Ulupinar, F.; Nevatia, R., "Shape from contour: straight homogeneous generalized cylinders and constant cross section generalized cylinders," Pattern Analysis and Machine Intelligence, IEEE Transactions on, vol. 17, No. 2, pp. 120,135, Feb. 1995.
Kazmi, I.K.; Lihua You; Jian Jun Zhang, "A Survey of Sketch Based Modeling Systems," Computer Graphics, Imaging and Visualization (CGIV), 2014 11th International Conference on, vol., No., pp. 27,36, Aug. 6-8, 2014.
Wong, K.K.Y., Paulo RS Mendonça, and Roberto Cipolla. "Reconstruction of surfaces of revolution from single incalibrated views." Proceedings of the British Machine Vision Conference. vol. 1. 2002.
Toeppe et al. "Relative volume constraints for single view 3D reconstruction.", IEEE Conference on Computer Vision and Pattern Recognition (CVPR), Jun. 23-28, 2013, pp. 177 to 184.
Zhuang, Yixin, et al., "A general and efficient method for finding cycles in 3D curve networks", ACM Transactions on Graphics, Nov. 2013, vol. 32, issue 6, Article No. 180.

(56) References Cited

OTHER PUBLICATIONS

Wang, Yingze, et al., "3D reconstruction of curved objects from single 2D line drawings." IEEE Conference on Computer Vision and Pattern Recognition (CVPR), Jun. 20-25, 2009.
Bessmeltsev, M., Wang, C., Sheffer, A., and Singh, K. 2012. Design-driven quadrangulation of closed 3d curves. ACM Trans. Graph. 31,5.
Chen, T., Zhu, Z., Shamir, A., Hu, S.-M., and Cohen-Or, D. 2013. 3-sweep: Extracting editable objects from a single photo. ACM Trans. Graphics 32, 6.
Kara, L. B., and Shimada, K. 2007. Sketch-based 3d-shape creation for industrial styling design. IEEE Comput. Graph. Appl. 27, 1, 60-71.
Do Carmo, M. P. 1976. Differential Geometry of Curves and Surfaces. Prentice-Hall, Englewood Cliffs, NJ.
Lau, M., Saul, G., Mitani, J., and Igarashi, T. 2010. Modeling-in-context: user design of complementary objects with a single photo. In Proc. Sketch-Based Interfaces and Modeling, 17-24.
Lee, S., Feng, D., and Gooch, B. 2008. Automatic construction of 3d models from architectural line drawings. In Proc. Interactive 3D graphics & games, 123-130.
Li, Y., Wu, X., Chrysanthou, Y., Shari, A., Cohen-Or, D., and Mitra, N. J. 2011. GlobFit: Consistently fitting primitives by discovering global relations. ACM Trans. Graph. 30, 4.
Lowe, D. G. 1987. Three-dimensional object recognition from single two-dimensional images. Artif. Intell. 31, 3, 355-395.
Nakayama, K., and Shimojo, S. 1992. Experiencing and Perceiving Visual Surfaces. Science 257, 1357-1363.
Olsen, L., Samavati, F., and Jorge, J. A. 2011. Naturasketch: Modeling from images and natural sketches. IEEE Computer Graphics and Applications 31, 6, 24-34.
Orbay, G., and Kara, L. B. 2012. Sketch-based surface design using malleable curve networks. Computers & Graphics 36, 8, 916-929.
Perkins, D. 1971. Cubic corners, oblique views of pictures, the perception of line drawings of simple space forms. geometry and the perception of pictures: Three studies. Tech. rep., Harvard Univ., Cambridge, MA. Graduate School of Education.
Pizlo, Z., and Stevenson, A. 1999. Shape constancy from novel views. Perception & Psychophysics 61, 7, 1299-1307.
Sharf, A., Alcantara, D. A., Lewiner, T., Greif, C., Sheffer, A., Amenta, N., and Cohen-Or, D. 2008. Space-time surface reconstruction using incompressible flow. ACM Trans. Graph. 27, 5, 110:1-110:10.
Shtof, A., Agathos, A., Gingold, Y., Shamir, A., and Cohen-Or, D. 2013. Geosemantic snapping for sketch-based modeling. Computer Graphics Forum 32, 2, 245-253.
Sykora, D., Kavan, L., t Mak, M., Jamri§ka, 0., Jacobson, A., Whited, B., Simmons, M., and Sorkine-Hornung, 0. 2014. Ink-and-ray: Bas-relief meshes for adding global illumination effects to hand-drawn characters. ACM Trans. Graphics 33.
Tian, C., Masry, M., and Lipson, H. 2009. Physical sketching: Reconstruction and analysis of 3D objects from freehand sketches. Computer Aided Design 41, 3, 147-158.
Liu, Y., Pottmann, H., Wallner, J., Yang, Y.-L., and Wang, W. 2006. Geometric modeling with conical meshes and developable surfaces. ACM Trans. Graphics 25, 3,681-689. Proc. SIGGRAPH.
Masry, M., Kang, D., and Lipson, H. 2005. A freehand in sketching interface for progressive construction of 3d objects. Computers & Graphics 29,4,563-575.
Mehra, R., Zhou, Q., Long, J., Sheffer, A., Gooch, A., and Mitra, N. J. 2009. Abstraction of man-made shapes. ACM Transactions on Graphics 28, 5, #137, 1-10.
Sutherland, I. 1964. Sketch pad a man-machine graphical communication system. In Proceedings of the SHARE design automation workshop, ACM, 6-329.
Eissen, K., and Steur, R. 2011. Sketching: The Basics. Bis Publishers.
Eissen, K., and Steur, R. 2008. Sketching: Drawing Tech-piques for Product Designers. Bis Publishers.

\* cited by examiner

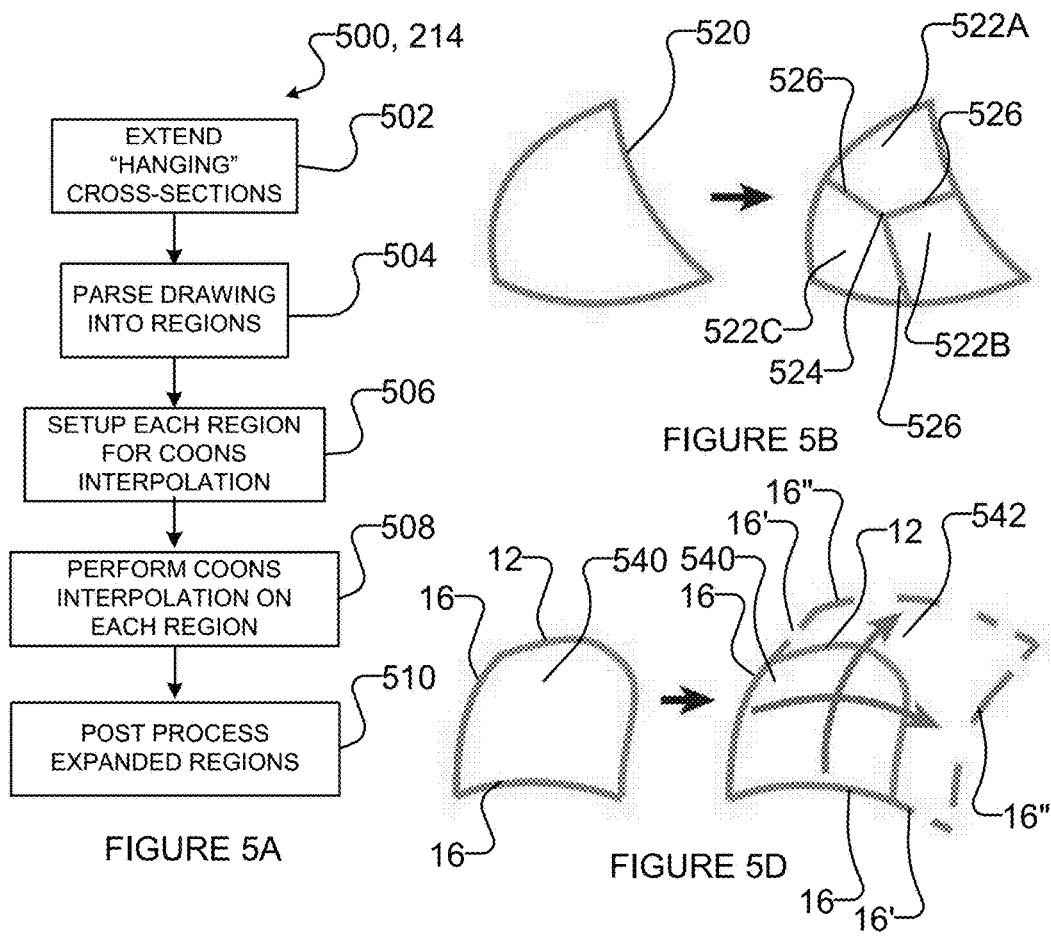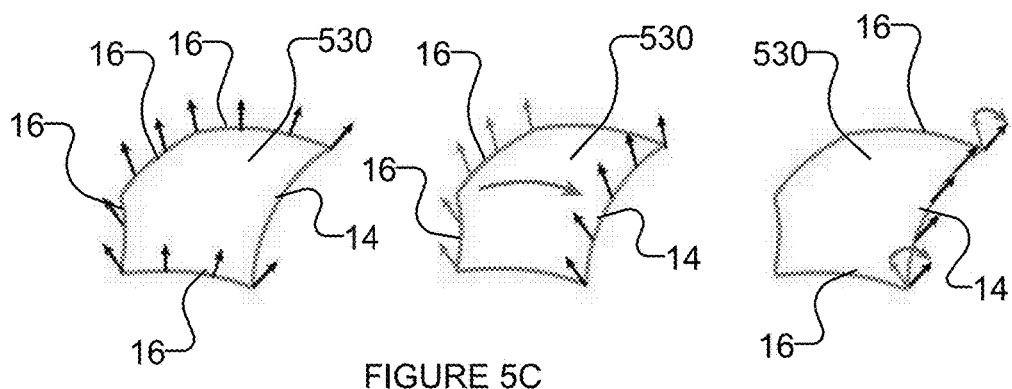

METHODS AND SYSTEMS FOR CHARACTERIZING CONCEPT DRAWINGS AND ESTIMATING THREE-DIMENSIONAL INFORMATION THEREFROM

RELATED APPLICATIONS

This application is a continuation of U.S. application Ser. No. 14/273,321 filed 8 May 2014, which in turn claims the benefit of the priority of U.S. applications No. 61/821,152 filed 8 May 2013 and No. 61/829,864 filed 31 May 2013. All of the applications referred to in this paragraph are hereby incorporated herein by reference.

TECHNICAL FIELD

This application relates to concept drawings or concept sketches as represented on a computer or similar processing environment. Particular embodiments provide methods and systems for characterizing concept drawings as represented on a computer or similar processing environment. Particular embodiments provide methods and systems for generating three-dimensional normal vector fields corresponding to two-dimensional concept drawings.

BACKGROUND

Concept drawings (also referred to as concept sketches) are used by artists and designers to convey the shapes of objects. Examples of concept drawings 10A and 10B (collectively, concept drawings 10) are shown in FIGS. 1A and 1B (collectively, FIG. 1). Concept drawing 10A of FIG. 1A is drawing of a hand cream container and concept drawing 10B of FIG. 1B is a drawing of a sports bag. The hand cream container and the sports bag may be referred to herein as the objects underlying concept drawings 10A, 10B, respectively. Concept drawings (whether drawn on paper or represented in a computer) typically comprise a plurality of two-dimensional curves which are used by the artist or designer to convey to observers three-dimensional information about the objects underlying the drawings. Concept drawings 10 typically include a number of types of two-dimensional curves. Boundary curves 11A, 11B (collectively, boundary curves 11) demarcate parts of the object underlying concept drawings 10. Boundary curves 11 may include smooth silhouette curves (or, for brevity, silhouettes) 12A, 12B (collectively, silhouettes 12) and sharp boundary curves (or, for brevity, sharp boundaries) 14A, 14B (collectively, sharp boundaries 14). Silhouettes 12 may demarcate transitions between visible and hidden parts of a smooth surface and may be dependent on the views depicted in concept drawings 10. In mathematical terms, silhouettes 12 may demarcate parts of concept drawings 10 where the surface normal of the objects underlying the concept drawings 10 transitions from facing toward the viewer to facing away from the viewer. Sharp boundaries 14 can demarcate ends of surfaces, junctions between different parts of objects, sharp bends on surfaces, discontinuous transitions and/or the like. In some views and/or for some objects boundary curves 11 can be both silhouettes 12 and sharp boundaries 14 or such silhouettes 12 and sharp boundaries 14 may overlap.

In addition to boundary curves, artists and designers typically use cross-section curves (or, for brevity, cross-sections) 16A, 16B (collectively, cross-sections 16) which aid in the drawing of concept sketches 10 and in the viewer's interpretation of the three-dimensional appearance of objects underlying concept sketches 10. The intersections of cross-sections 16 may be referred to as cross-hairs 18. When drawn in concept sketches (on paper or on computer representations), cross-sections 16 are only two-dimensional. However, cross-sections 16 are used to convey three-dimensional information about the objects underlying the concept drawings by depicting intersections of imagined three-dimensional surfaces with three-dimensional planes. Cross-sections 16 and cross-hairs 18 carry important perceptual information for viewers and are typically drawn at or near locations where they maximize (or at least improve) the clarity of concept sketches 10.

There is a general desire to characterize concept drawings 10. Such characterization may comprise generating three-dimensional information based on two-dimensional concept drawings 10.

The foregoing examples of the related art and limitations are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a method for characterizing a concept drawing comprising a plurality of cross-hairs, each cross-hair comprising an intersection of two corresponding cross-sections. The characterization method may comprise generating three-dimensional mathematical characteristics about an object underlying the concept drawing based on the two-dimensional concept drawing. The characterization method may be implemented, at least in part, by one or more computers or suitably configured processors. The characterization method may comprise analyzing the plurality of cross-hairs. Analyzing the plurality of cross-hairs may comprise, for each cross-hair: defining the two corresponding cross-sections to be on two corresponding planes having cross-section normal vectors $n_i$, $n_j$ in a three-dimensional coordinate system and requiring that the two corresponding planes are approximately orthogonal to one another ($|n_i \cdot n_j| \leq \varepsilon$), where $\varepsilon$ is a positive number close to zero and is a parameter used to accommodate error in the concept drawing; defining tangent vectors along the two corresponding cross-sections in the three-dimensional coordinate system and requiring that the two tangent vectors of the two corresponding cross-sections at the location of the cross-hair ($t_{ij}$, $t_{ji}$) are approximately orthogonal to one another ($|t_{ij} \cdot t_{ji}| \leq \gamma$) where $\gamma$ is a positive number close to zero and is a parameter used to accommodate error in the concept drawing.

In some embodiments, the characterization method may comprise, in circumstances where the concept drawing comprises a silhouette and one of the cross-sections intersects the silhouette, requiring that a tangent vector on the cross-section at the intersection of the cross-section and the silhouette ($t_s$) must have a depth (z) component that extends out of a view plane of the concept drawing and toward the viewer in the three-dimensional coordinate system.

Another aspect of the invention provides a method for generating a normal vector field that represents a surface of an object underlying a concept drawing, the concept drawing comprising a plurality of cross-sections and a plurality of cross-hairs, each cross-hair comprising an intersection of two corresponding cross-sections. The normal vector generating method is implemented, at least in part, by one or more computers or suitably configured processors. The method comprises performing a constrained optimization which minimizes an objective function subject to one or more constraints to solve for: a plurality of cross-section normal vectors, each cross-section normal vector $n_i$ corresponding to an $i^{th}$ one of the cross-sections and normal to an $i^{th}$ plane defined in a three-dimensional coordinate system and such that the $i^{th}$ plane includes the $i^{th}$ one of the cross-sections; a plurality of tangent vectors in the three-dimensional coordinate system, each tangent vector $t_{ij}$ corresponding to an $ij^{th}$ one of the cross-hairs and comprising a tangent to the $i^{th}$ one of the cross-sections at a location, in the three-dimensional coordinate system, of the $ij^{th}$ cross-hair where the $i^{th}$ one of the cross-sections intersects the $j^{th}$ one of the cross-sections; and a plurality of offset values, each offset value $c_i$ representing a location of the $i^{th}$ plane in the three-dimensional coordinate system (e.g. $c_i$ may represent a closest distance from the origin of the three-dimensional coordinate system to the $i^{th}$ plane). The method comprises: generating a normal vector field comprising a plurality of cross-hair surface normal vectors in the three-dimensional coordinate system, each cross-hair surface normal vector $n_{ij}$ located at the location, in the three-dimensional coordinate system, of the $ij^{th}$ cross-hair where the $i^{th}$ one of the cross-sections intersects the $j^{th}$ one of the cross-sections and oriented orthogonally to the surface of the object underlying the concept drawing at the location of the $ij^{th}$ cross-hair, wherein generating the plurality of cross-hair surface normal vectors is based at least in part on one or more of: the plurality of cross-section normal vectors, the plurality of tangent vectors and the plurality of offset values. The method may comprise propagating the cross-hair surface normal vectors to locations away from the cross-hairs to further populate the normal vector field at locations away from the cross-hairs.

Another aspect of the invention provides a method for characterizing an object underlying a concept drawing, the concept drawing comprising a plurality of cross-sections and a plurality of cross-hairs, each cross-hair comprising an intersection of two corresponding cross-sections. The characterization method comprises determining parameters for a plurality of planes in a three-dimensional coordinate system, each of the planes including a corresponding one of the cross-sections. The characterization method may optionally involve determining an estimate of the curves of the cross-sections in the three-dimensional coordinate system wherein the curve for each cross-section in the three-dimensional coordinate system is located on the plane corresponding to the cross-section. The characterization method is implemented, at least in part, by one or more computers or suitably configured processors. The method comprises performing a constrained optimization which minimizes an objective function subject to one or more constraints to solve for: a plurality of cross-section normal vectors, each cross-section normal vector $n_i$ corresponding to an $i^{th}$ one of the cross-sections and normal to an $i^{th}$ plane defined in a three-dimensional coordinate system and such that the $i^{th}$ plane includes the $i^{th}$ one of the cross-sections; a plurality of tangent vectors in the three-dimensional coordinate system, each tangent vector $t_{ij}$ corresponding to an $ij^{th}$ one of the cross-hairs and comprising a tangent to the $i^{th}$ one of the cross-sections at a location, in the three-dimensional coordinate system, of the $ij^{th}$ cross-hair where the $i^{th}$ one of the cross-sections intersects the $j^{th}$ one of the cross-sections; and a plurality of offset values, each offset value $c_i$ representing a location of the $i^{th}$ plane in the three-dimensional coordinate system (e.g. $c_i$ may represent a closest distance from the origin of the three-dimensional coordinate system to the $i^{th}$ plane).

In some embodiments, the objective function and/or the one or more constraints are based on mathematical characteristics of concept drawings which relate to how the concept drawings are commonly perceived to represent three-dimensional objects. In some embodiments, the objective function and/or the one or more constraints is based on the characteristic that, for each cross-hair, the cross-section normal vectors $n_i$, $n_j$ of the two corresponding cross-sections that intersect at the cross-hair are approximately orthogonal to one another ($|n_i \cdot n_j| \leq \varepsilon$), where $\varepsilon$ is a positive number close to zero and is a parameter used to accommodate error in the concept drawing. In some embodiments, the objective function and/or the one or more constraints is based on the characteristic that, for each cross-hair, the tangent vectors $t_{ij}$ and $t_{ji}$ of the two corresponding cross-sections at the location of the cross-hair are approximately orthogonal to one another ($|t_{ij} \cdot t_{ji}| \leq \gamma$), where $\gamma$ is a positive number close to zero and is a parameter used to accommodate error in the concept drawing.

In some embodiments, the objective function and/or the one or more constraints is based at least in part on $t_{ij} \times n_j$ and $t_{ji} \times n_i$, where, for each cross-hair, $n_i$, $n_j$ represent the cross-section normal vectors of the two corresponding cross-sections and $t_{ij}$ and $t_{ji}$ the tangent vectors of the two corresponding cross-sections at the location of the cross-hair. In some embodiments, the objective function and/or the one or more constraints is based at least in part on the sum $\Sigma[(t_{ij}^z)^2 + (t_{ji}^z)^2]$ over the plurality of cross-hairs, where, for each cross-hair, $t_{ij}^z$ and $t_{ji}^z$ are the z-components of the tangent vectors $t_{ij}$ and $t_{ji}$ of the two corresponding cross-sections at the location of the cross-hair and the z-direction orthogonal to a view plane of the concept drawing.

In some embodiments, in circumstances where the concept drawing comprises a silhouette and a particular cross-section intersects the silhouette, performing the constrained optimization may comprise assuming that a tangent vector on the particular cross-section at the intersection of the cross-section and the silhouette ($t_s$) has a depth (z) component that extends out of a view plane of the concept drawing and toward the viewer in the three-dimensional coordinate system.

Some embodiments provide systems where steps of the methods described herein are performed by one or more computers and/or one or more suitably configured processors.

Some embodiments provide computer program products comprising a set of instructions embodied on a non-transitory computer readable medium, the instructions when executed by a processor, cause the processor to perform the methods described herein.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 5A is a block diagram of a method for propagating surface normal vectors to regions off of cross-sections that may be used in the method of FIG. 2B. FIGS. 5B, 5C and 5D are schematic drawings which show how regions are processed to make them suitable for Coons interpolation.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

One aspect of the invention provides a method for characterizing a concept drawing comprising a plurality of cross-hairs, each cross-hair comprising an intersection of two corresponding two-dimensional cross-sections. The characterization method may comprise generating three-dimensional mathematical characteristics about an object underlying the concept drawing based on the two-dimensional concept drawing. The characterization method is implemented, at least in part, by one or more computers or suitably configured processors. The characterization method may comprise analyzing the plurality of cross-hairs. Analyzing the plurality of cross-hairs may comprise, for each cross-hair: defining the two corresponding cross-sections to be on two corresponding planes having cross-section normal vectors $n_i$, $n_j$ in a three-dimensional coordinate system and requiring that the two corresponding planes are approximately orthogonal to one another ($|n_i \cdot n_j| \leq \varepsilon$), where $\varepsilon$ is a positive number close to zero and is a parameter used to accommodate error in the concept drawing; defining tangent vectors along the two corresponding cross-sections in the three dimensional coordinate system and requiring that the two tangent vectors of the two corresponding cross-sections at the location of the cross-hair ($t_{ij}$, $t_{ji}$) are approximately orthogonal to one another ($|t_{ij} \cdot t_{ji}| \leq \gamma$) where $\gamma$ is a positive number close to zero and is a parameter used to accommodate error in the concept drawing. The characterization method may optionally comprise, in circumstances where the concept drawing comprises a two-dimensional silhouette and one of the cross-sections intersects the silhouette, requiring that a tangent vector on the cross-section at the intersection of the cross-section and the silhouette ($t_s$) have a depth (z) component that extends out of a view plane of the concept drawing and toward the viewer in the three-dimensional coordinate system.

Figures 2A, 2B, 2C:
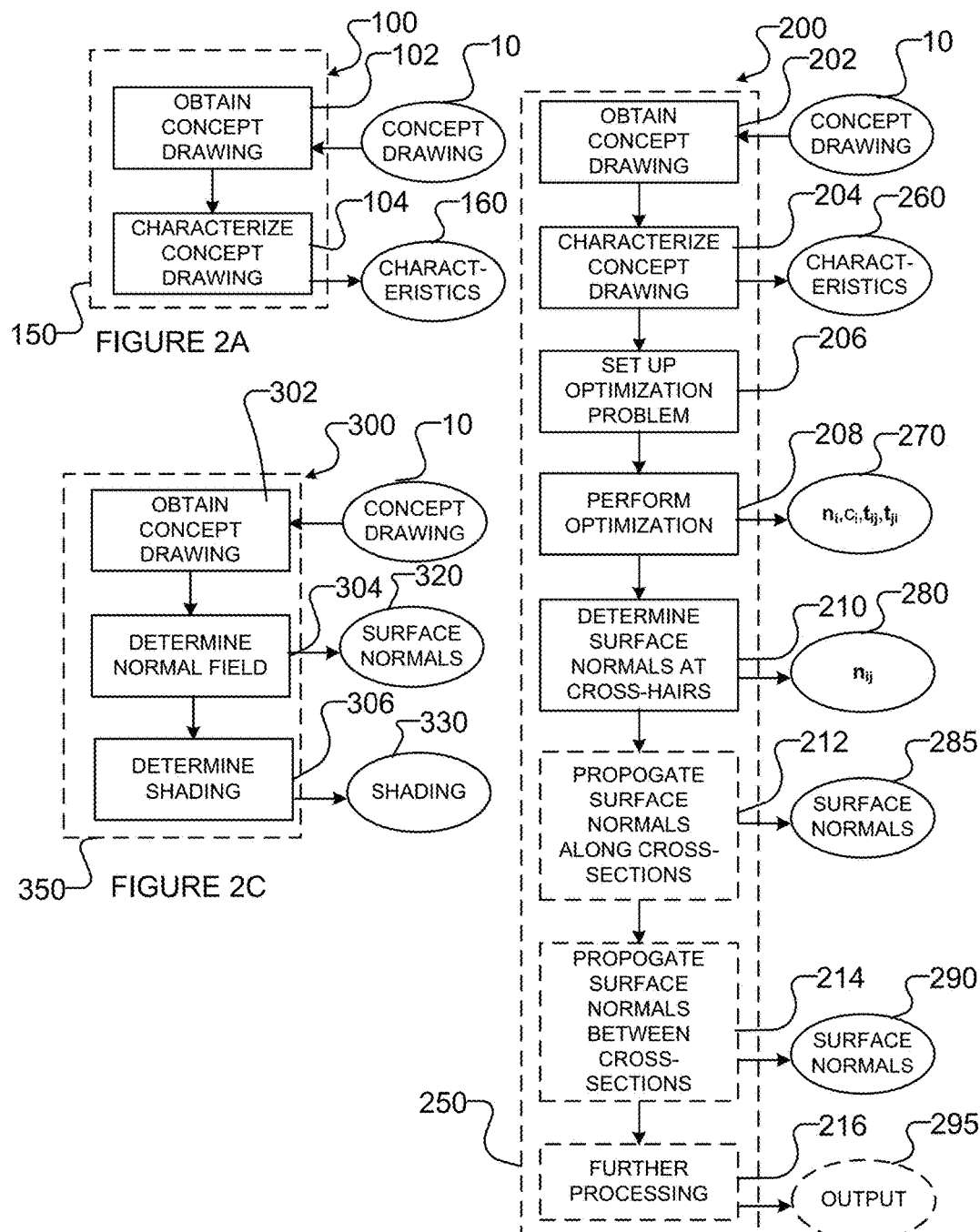
FIG. 2A is a block diagram of a method for characterizing a concept drawing according to a particular embodiment.
FIG. 2B is a block diagram of a method for generating a normal vector field that represents a surface of an object underlying a concept drawing according to a particular embodiment.
FIG. 2C is a block diagram of a method for generating a normal vector field that represents a surface of an object underlying a concept drawing and generating representative shading for the object underlying the concept drawing based on the normal vector field according to a particular embodiment.

FIG. 2A is a block diagram of a method 100 for characterizing a concept drawing according to a particular embodiment. Characterization method 100 may be implemented, at least in part, by one or more computers or suitably configured processors 150—shown in dashed lines in FIG. 2B. Characterization method 100 may comprise generating three-dimensional mathematical characteristics about an object underlying the concept drawing based on the two-dimensional concept drawing (e.g. based on the two-dimensional curves of the concept drawing). Method 100 starts in block 102 which comprises procuring a concept drawing 10 as input. In some embodiments, concept drawing 10 is received as input to computer system 150 (e.g. concept drawing 10 may be generated on paper and scanned or generated on some other computer and/or the like and may be provided to computer system 150 as input). In some embodiments, concept drawing may be generated in computer system 150 and may be generated using the same software as that which implements characterization method 100 or using different software (e.g. commercial drawing and/or sketching software (Adobe Illustrator, Autodesk Sketchbook, Inkscape and/or the like) and/or the like).

Figure 1A:
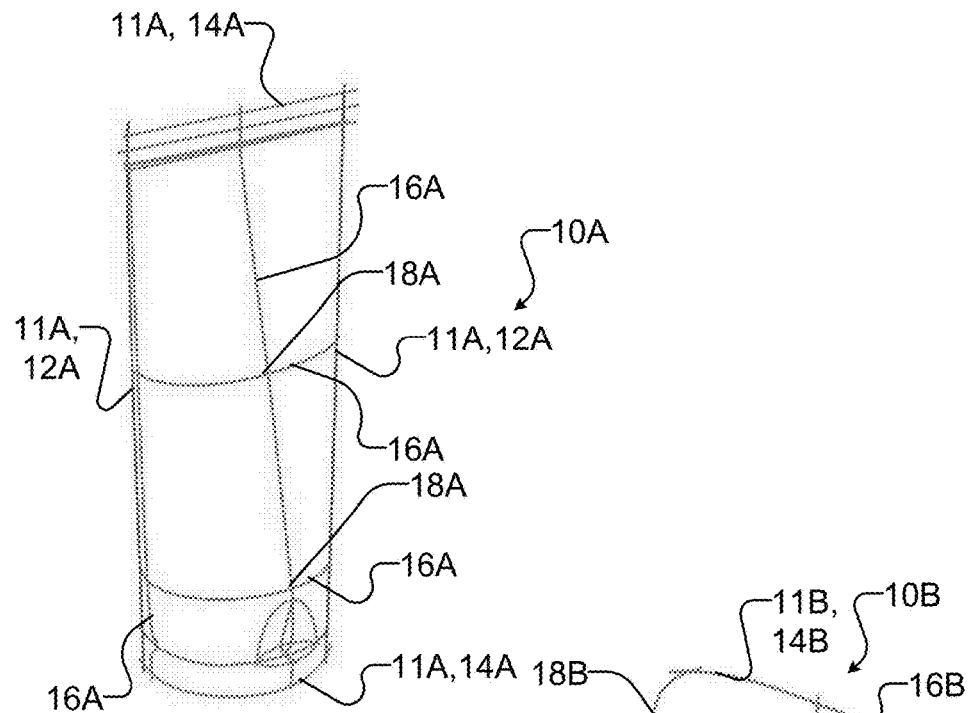
FIGS. 1A and 1B are representative examples of concept drawings.
Figure 1B:
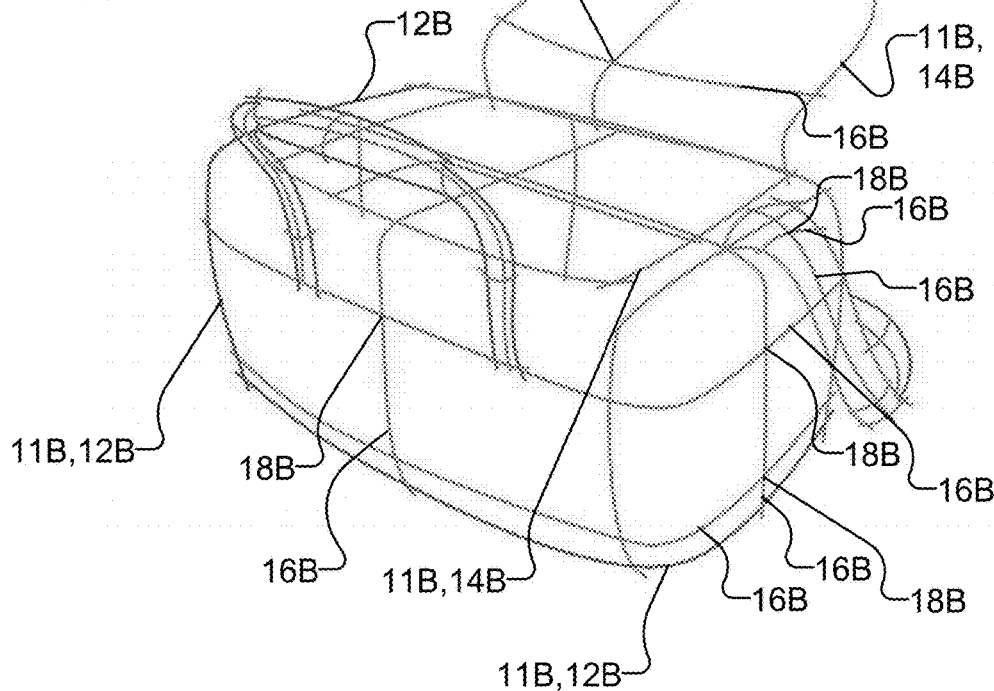

Exemplary and non-limiting concept drawings 10 are illustrated in FIG. 1. In the case of concept drawing 10A of FIG. 1A, the object underlying concept drawing 10A is a hand cream container and the object underlying concept drawing 10B is a sports bag. It will be appreciated that concept drawings 10 of FIGS. 1A and 1B are only representative examples and that method 100 may be used to characterize any suitable concept drawings and any suitable underlying objects. As discussed above, concept drawings 10 are two-dimensional drawings which comprise one or more two-dimensional boundary curves (which may include silhouettes 12 and sharp boundaries 14). Concept drawings 10 also typically comprise one or more two-dimensional cross-sections 16, used to try to convey three-dimensional information about the object underlying concept drawings 10 to viewers. In the case of characterization method 100, the concept drawings procured in block 102 may comprise a plurality of cross-sections 16 and such cross-sections 16 may intersect one another at a plurality of cross-hairs 18. As will be explained in more detail below, method 100 may characterize the block 102 input concept drawing based, at least in part, on its cross-hairs. In some cases, a block 102 input concept drawing may not have a plurality of cross-hairs 18. In such cases, block 102 may reject the concept drawing and require that an artist manually add additional cross-sections 16 and/or cross-hairs 18. In some embodiments, obtaining a concept drawing in block 102 may involve creating, editing or augmenting the concept drawing.

It is assumed, for the purposes of this description, that two-dimensional concept drawings 10 are defined in a plane referred to as the view plane. The view plane may be defined by the x and y-axes of a three-dimensional coordinate system and the z-axis may be defined to be the axis orthogonal to the view plane and in the view direction, where the positive z-direction is toward the viewer and the negative z-direction is away from the viewer. It will be appreciated that this definition of the axes of the three-dimensional coordinate system is selected to model three-dimensional space and is not unique. Other three-dimensional coordinate system definitions could be envisaged to model three dimensional space.

It is assumed, for the purposes of explaining method 100, that obtaining the block 102 concept drawing comprises determining the spatial location of boundary curves (silhouettes 12, sharp boundaries 14), cross-sections 16 and cross-hairs 18 in a two-dimensional spatial coordinate system. In some embodiments, this spatial location information may comprise part of the block 102 input (i.e. the data representative of the block 102 concept drawings may comprise this spatial location information prior to being received in block 102). In some embodiments, this spatial location information may be generated in block 102. By way of non-limiting example, the block 102 concept drawing spatial location information may be generated from vector drawing software, bit maps or hand-drawn sketches converted into vector formats, existing models, scanned three-dimensional models and/or the like). In general, the block 102 concept drawing spatial location information may come from or be generated from any suitable source. In some embodiments, block 102 may also involve characterizing the curves in the input concept drawing as being cross-sections 16, silhouettes 12 or sharp boundaries 14. In some embodiments, this curve characterization may be input to method 100 as part of block 102. In some embodiments, block 102 may involve determining this curve characterization information via user input, using suitable heuristics, suitable estimation algorithms or otherwise.

Figure 3A:
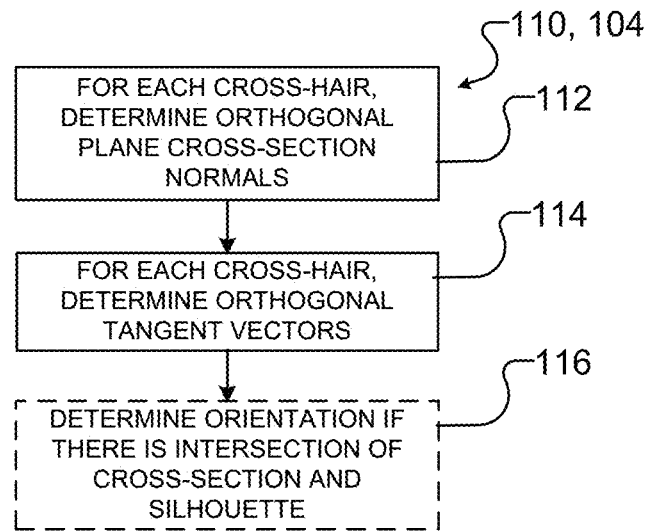
FIG. 3A is a characterization method according to a particular embodiment which may be used as a part of the FIG. 2A characterization method.

Method 100 (FIG. 2A) then proceeds to block 104 which involves characterizing the concept drawing obtained in block 102. FIG. 3A is a block diagram of a characterization method 110 suitable for use in block 104 of method 100. Characterization method 110 is based on the inventors' study of how cross-sections 16 and cross-hairs 18 are used by artists and how cross-sections 16 and cross-hairs 18 are perceived by viewers. Characterization method 110 commences in block 112 which involves ascertaining a property (e.g. a three-dimensional property) about the pair of cross-sections 16 that intersect at each cross-hair 18 in the concept drawing. More particularly, for each cross-hair 18, block 112 involves defining the two corresponding cross-sections 16 to be on two corresponding three-dimensional planes having cross-section normal vectors $n_i$, $n_j$ in a three-dimensional coordinate system and requiring that the two corresponding planes are approximately orthogonal to one another—i.e. ($|n_i \cdot n_j| \approx 0$). In some embodiments, the two planes may be considered to be approximately orthogonal when:

$$|n_i \cdot n_j| \leq \varepsilon \quad (1)$$

where $\varepsilon$ is a positive number close to zero and is a parameter which may be configurable and which may be used to accommodate error in the concept drawing.

Figure 3B:
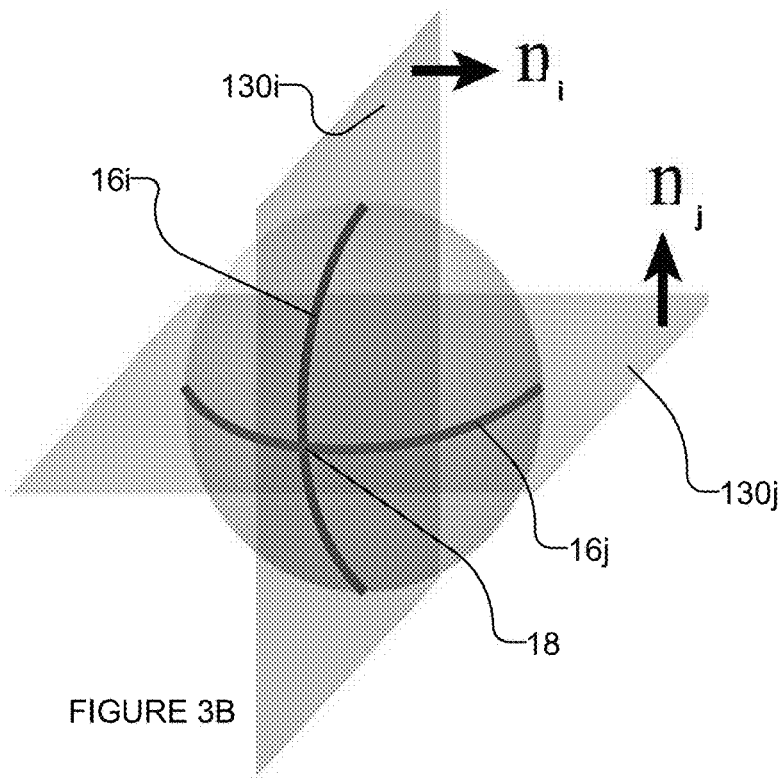
FIG. 3B is an illustrative drawing showing the orthogonality of cross-section normal vectors according to the FIG. 3A characterization method.

Block 112 may be better understood using FIG. 3B as an exemplary reference. FIG. 3B shows a pair of cross-sections 16i, 16j which intersect at a cross-hair 18. Each of cross-sections 16i, 16j is characterized as being located on a corresponding plane 130i, 130j in a three-dimensional coordinate system, where planes 130i, 130j have normal vectors $n_i$, $n_j$ respectively in the three-dimensional coordinate system. Block 112 requires that the normal vectors $n_i$, $n_j$ for each cross-hair 18 be at least approximately orthogonal to one another.

Characterization method 110 then proceeds to block 114. Block 114 involves ascertaining a property about the pair of cross-sections 16 that intersect at each cross-hair 18 in the concept drawing. More particularly, for each cross-hair 18, block 114 involves: defining tangent vectors along the two corresponding cross-sections 16 in the three dimensional coordinate system; and requiring that the two tangent vectors of the two corresponding cross-sections 16 at the location of the cross-hair 18 ($t_{ij}$, $t_{ji}$) are at least approximately orthogonal to one another—i.e. $|t_{ij} \cdot t_{ji}| \approx 0$, where $t_{ij}$ is the tangent to the $i^{th}$ cross-section 16 at the location where the $i^{th}$ cross-section 16 forms a cross-hair 18 with the $j^{th}$ cross-section 16 and $t_{ji}$ is the tangent to the $j^{th}$ cross-section 16 at the location where the $j^{th}$ cross-section 16 forms a cross-hair 18 with the $i^{th}$ cross-section 16. In some embodiments, the two tangent vectors may be considered to be approximately orthogonal when:

$$|t_{ij} \cdot t_{ji}| \leq \gamma \quad (2)$$

where $\gamma$ is a positive number close to zero and is a parameter which may be configurable and which may be used to accommodate error in the concept drawing.

Figure 3C:
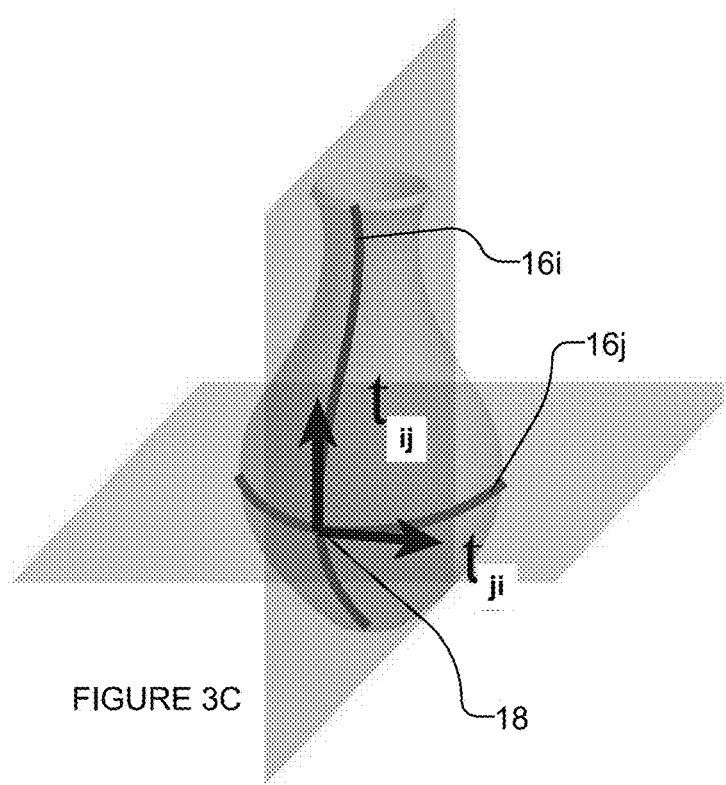
FIG. 3C is an illustrative drawing showing the orthogonaity of tangent vectors of cross-sections at the locations of cross-hairs according to the FIG. 3A characterization method.

Block 114 may be better understood using FIG. 3C as an exemplary reference. FIG. 3C shows a cross-hair 18 provided by the intersection of two cross-sections 16i, 16j and the tangent vectors to the two cross-sections 16i, 16j at the location of cross-hair 18. More particularly, FIG. 3C shows $t_{ij}$ (i.e. the tangent to cross-section 16i at the location where cross-section 16i forms a cross-hair 18 with cross-section 16j) and $t_{ji}$ (i.e. the tangent to cross-section 16j at the location where cross-section 16j forms a cross-hair 18 with cross-section 16i). Block 114 requires that the tangent vectors ($t_{ij}$, $t_{ji}$) for each cross-hair 18 be at least approximately orthogonal to one another.

Figures 3D, 3E:
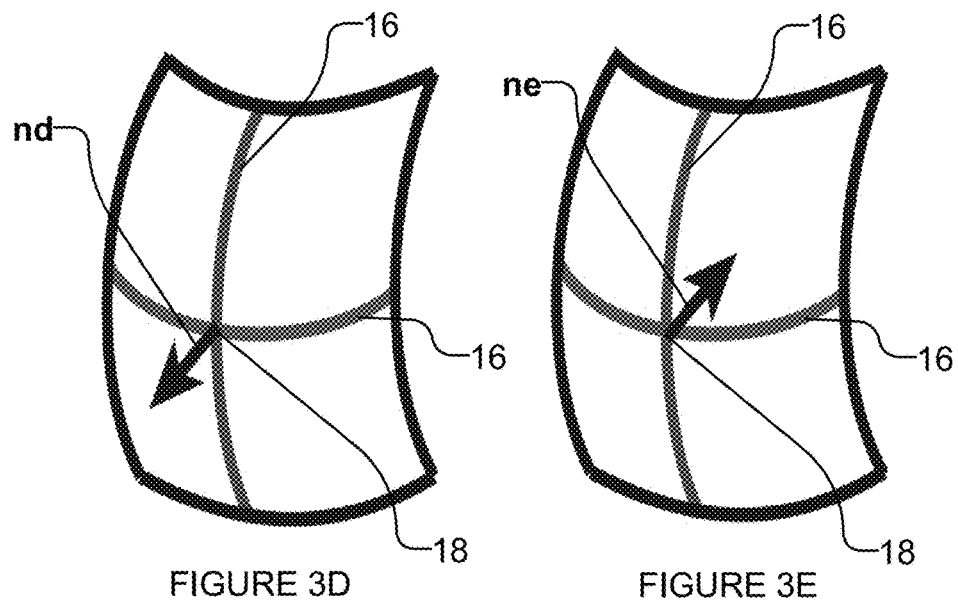
FIGS. 3D and 3E are illustrative drawing showing the ambiguity in surface direction based on intersecting cross-sections.

Method 110 (FIG. 3A) comprises an optional block 116 which may be used in circumstances where the input concept drawing includes a cross-section 16 that intersects with a silhouette 12. Block 116 involves resolving an inherent ambiguity regarding the perception of shape based on intersecting cross-sections 16. FIGS. 3D and 3E show this ambiguity. Cross-hair 18 and its corresponding cross-sections 16 are the same in both FIGS. 3D and 3E. In FIG. 3D, surface normal vector $n_d$ points downwardly so that the corresponding surface is interpreted as being convex. In contrast, in FIG. 3E, surface normal vector $n_e$ points upwardly so that the corresponding surface is interpreted as being concave.

Figure 3F:
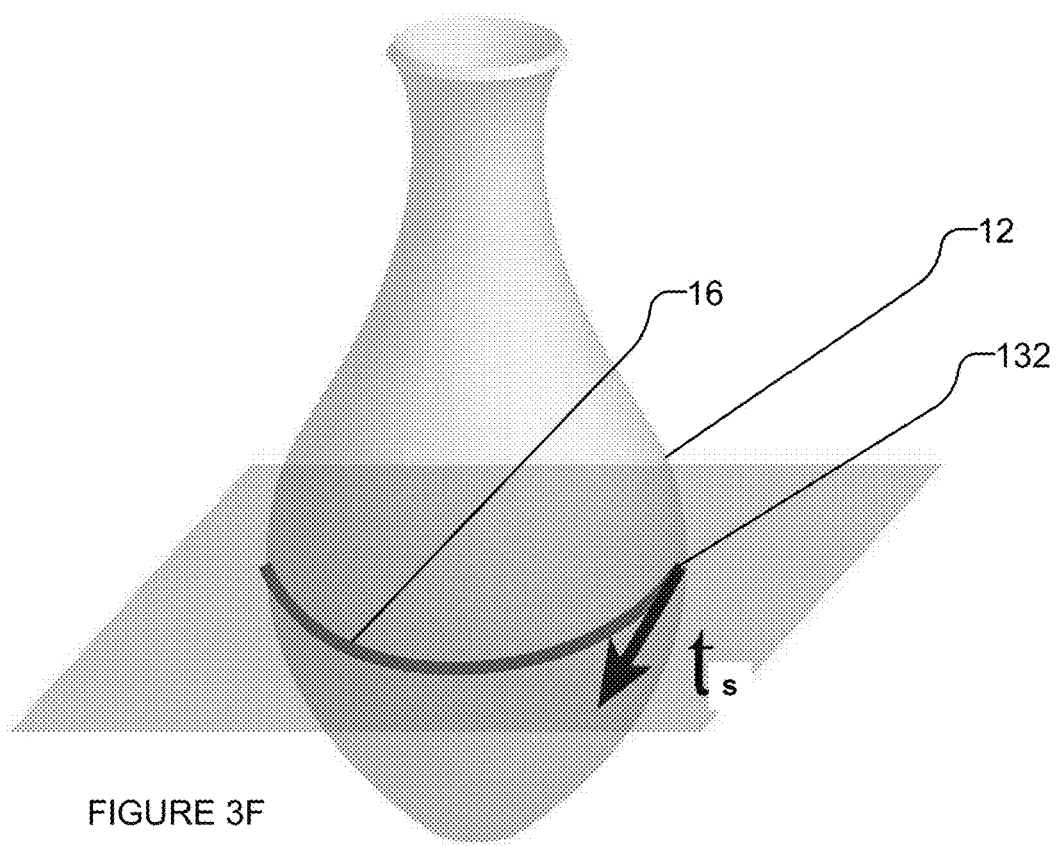
FIG. 3F is an illustrative drawing showing the directionality of a tangent vector at a location in an immediate vicinity of the intersection between a cross-section and a silhouette which may be used in the FIG. 3A characterization method.

This ambiguity can be resolved in circumstances where the input concept drawing includes a cross-section 16 that intersects with a silhouette 12. A silhouette (also referred to as a smooth silhouette) is defined as a curve where the surface normal vector is orthogonal to the view direction (i.e. the z-axis). By definition, the surface in an immediate vicinity of silhouette 12 must be closer to the viewer than the silhouette 12 itself. This is demonstrated in FIG. 3F which shows a cross-section 16 intersecting with a silhouette 12 at a location 132. At a location on cross-section 16 and in reasonably close proximity to location 132, the tangent vector $t_s$ along cross-section 16 must have a depth (z) component that extends out of a view plane of the concept drawing and toward the viewer in the three-dimensional coordinate system. The directionality of the tangent vector $t_s$ (toward the viewer) may be used as a basis for resolving the ambiguity in the directionality of the surface normal vector at, or reasonably close to, the intersection 132, since the surface normal vector must also point toward the user and be orthogonal to $t_s$.

At the conclusion of characterization method 110 (FIG. 3A), or characterization block 104 of method 100 (FIG. 2A), the block 102 input concept drawing 10 (and its cross-sections 16) have been characterized in a three-dimensional coordinate system to provide characteristics 160. Characteristics 160 comprise: the block 112 properties of the cross-section normal vectors $n_i$, $n_j$ which are normal to the planes on which the cross-sections 16 lie; the block 114 properties of the tangents $t_{ij}$ and $t_{ji}$ to the cross-sections 16 at the locations of the cross-hairs 18; and, optionally, in circumstances where a cross-section 16 intersects a silhouette 12, the block 116 directionality of the tangent vector $t_s$ at a location in an immediate vicinity of this intersection.

Another aspect of the invention provides a method for generating a normal vector field that represents a surface of an object underlying a concept drawing. The normal vector generating method is implemented, at least in part, by one or more computers or suitably configured processors. The method may involve using some of the method 100 characterization information to perform a constrained optimization which minimizes an objective function subject to one or more constraints to solve for a plurality of three-dimensional cross-section normal vectors, each cross-section normal vector $n_i$ corresponding to an $i^{th}$ one of the cross-sections and normal to an $i^{th}$ plane defined in a three-dimensional coordinate system and such that the $i^{th}$ plane includes the $i^{th}$ one of the cross-sections; a plurality of three-dimensional tangent vectors in the three-dimensional coordinate system, each tangent vector $t_{ij}$ corresponding to an $ij^{th}$ one of the cross-hairs and comprising a tangent to the $i^{th}$ one of the cross-sections at a location, in the three-dimensional coordinate system, of the $ij^{th}$ cross-hair where the $i^{th}$ one of the cross-sections intersects the $j^{th}$ one of the cross-sections; and a plurality of offset values, each offset value $c_i$ representing a location of the $i^{th}$ plane (i.e. the plane that includes the $i^{th}$ cross-section) in the three-dimensional coordinate system (e.g. $c_i$ may represent a closest distance from the origin of the three-dimensional coordinate system to the $i^{th}$ plane). The method comprises: generating a normal vector field comprising a plurality of cross-hair surface normal vectors in the three-dimensional coordinate system, each cross-hair surface normal vector $n_{ij}$ located at the location, in the three-dimensional coordinate system, of the $ij^{th}$ cross-hair where the $i^{th}$ one of the cross-sections intersects the $j^{th}$ one of the cross-sections and oriented orthogonally to the surface of the object underlying the concept drawing at the location of the $ij^{th}$ cross-hair, wherein generating the plurality of cross-hair surface normal vectors is based at least in part on one or more of: the plurality of cross-section normal vectors, the plurality of tangent vectors and the plurality of offset values. The method may comprise propagating the cross-hair surface normal vectors to locations away from the cross-hairs to further populate the normal vector field at locations away from the cross-hairs.

FIG. 2B is a block diagram of a method 200 for generating a normal vector field that represents a surface of an object underlying a concept drawing according to a particular embodiment. Normal vector generating method 200 is implemented, at least in part, by one or more computers or suitably configured processors 250—shown in dashed lines in FIG. 2B. Method 200 may comprise performing a constrained optimization which minimizes an objective function subject to one or more constraints, wherein the objective function and/or the constraints are based at least in part on concept drawing characterization of the type obtained in method 100 described above. As explained in more detail below, the output of this constrained optimization may include information that defines (in a three-dimensional coordinate system) one plane for each cross-sections 16 in the concept drawing, where each cross-section lies on its corresponding plane. The output of this constrained optimization may also include information desirable to obtain three-dimensional representations (i.e. representations in the three-dimensional coordinate system) of the tangent vectors to the cross-sections 16 at the locations of the cross-hairs 18 in the concept drawing. This information may comprise depth (z-direction) information in respect of the tangent vectors to the cross-sections 16 at the locations of the cross-hairs 18 in the concept drawing.

Method 200 commences in block 202 which involves procuring a concept drawing 10 as input. Block 202 of method 200 may be substantially similar to block 102 of method 100 described above. In some embodiments, concept drawing 10 is received as input to computer system 250 (e.g. concept drawing 10 may be generated on paper and scanned or generated on some other computer and/or the like and may be provided to computer system 250 as input). In some embodiments, concept drawing may be generated in computer system 250 and may be generated using the same software as method 200 or using different software (e.g. commercial drawing and/or sketching software and/or the like). Method 200 then proceeds to block 204 which involves characterizing the concept drawing obtained in block 202. Block 204 may be substantially similar to block 104 of method 100 described above and may generate characteristics 260 similar to characteristics 160 described above. Method 200 then proceeds to block 206 which involves setting up an optimization problem. In some embodiments, the block 206 optimization problem set up is based on one or more additional observations about concept drawings and the manner in which concept drawings (and their cross-sections 16) are used by designers/artists and interpreted by viewers.

In some embodiments, one observation used in the block 206 optimization problem set up is that designers/artists tend to use cross-sections 16 which are local geodesics. A cross-section 16 on a surface of an underlying object is a local geodesic if it defines the shortest distance between two points on the surface. Given the block 204 characterization, a cross-section 16 also lies in a plane (see block 112 and FIG. 3B described above). It is known that if a surface curve lies on a plane and is a local geodesic, then the surface normal vector along the curve lies in the three-dimensional plane of that curve. Given the block 204 characterization, it may be proved that for an $ij^{th}$ cross-hair 18 between an $i^{th}$ cross-section 16 and a $j^{th}$ cross-section 16 where the $i^{th}$ cross-section 16 is a local geodesic, the cross-section normal $n_i$ of the $i^{th}$ plane which includes the $i^{th}$ cross-section 16 is co-linear with the tangent vector $t_{ji}$ to the $j^{th}$ cross-section 16 at the location of the $ij^{th}$ cross-hair 18. More particularly, the surface normal vector $n_{ij}$ (of the underlying object) at the location of the $ij^{th}$ cross-hair 18 is orthogonal to both $t_{ij}$ and $t_{ji}$. If the $i^{th}$ cross-section is a local geodesic, then $n_{ij}$ is also orthogonal to the cross-section normal $n_i$. However, there can only be three mutually orthogonal vectors in $R^3$. Accordingly, the cross-section normal $n_i$ must be co-linear with $t_{ji}$.

If both the $i^{th}$ cross-section 16 and the $j^{th}$ cross-section 16 at a cross-hair 18 are local geodesics, then this orthogonality property can be expressed as:

$$t_{ij} \times n_j = 0 \text{ and } t_{ji} \times n_i = 0 \qquad (3)$$

It is not always the case that both cross-sections 16 at a cross-hair 18 are local geodesics. It may be demonstrated that where $\varepsilon = \gamma = 0$, the block 204 characterization requires that at least one cross-section 16 at a cross-hair 18 be a local geodesic, but there are circumstances where the other one of the cross-sections 16 at a cross-hair 18 is not a local geodesic. Accordingly, the equation (3) observation is one that may be true for some, but not necessarily all cross-hairs 18. This can make the equation (3) observation suitable for use in an objective function of an optimization problem.

In some embodiments, another observation used in the block 206 is that designers/artists tend to use informative viewpoints which minimize or reduce foreshortening over the entire drawing. A single cross-hair 18 between an $i^{th}$ cross-section 16 and a $j^{th}$ cross-section 16 is minimally foreshortened where both the tangent to $i^{th}$ cross-section 16 at the location of the cross-hair 18 ($t_{ij}$) and the tangent to the $j^{th}$ cross-section 16 at the location of the cross-hair 18 ($t_{ji}$) are in the view plane. If a three-dimensional coordinate system is constructed such that the z-axis or z-direction is orthogonal to the view frame, an expression representative of the foreshortening over all of the cross-hairs 18 in the concept drawing is given by:

$$\Sigma[(t_{ij}^z)^2 + (t_{ji}^z)^2] \qquad (4)$$

where the sum is taken over all of the cross-hairs 18 in the concept drawing and $t_{ij}^z$ and $t_{ji}^z$ are the z-components of the tangent vectors $t_{ij}$ and $t_{ji}$ of the two cross-sections 16 at the location of each cross-hair 18. The minimal foreshortening observation is then satisfied when the equation (4) sum is minimized. As was the case with the observation of equation (3), it is not always the case that foreshortening is absolutely minimized over an entire concept drawing. Accordingly, the equation (4) observation can be suitable for use in an objective function of an optimization problem.

Block 206 involves setting up an optimization problem which may be used to solve for some of the three-dimensional characteristics of the block 202 input concept drawing. In some embodiments, these three-dimensional characteristics can include information that defines (in a three-dimensional coordinate system) one plane for each cross-section 16 in the concept drawing, where each cross-section 16 lies on its corresponding plane. In some embodiments, these three-dimensional characteristics may also include information desirable to obtain three-dimensional representations (i.e. representations in the three-dimensional coordinate system) of the tangent vectors to the cross-sections 16 at the locations of the cross-hairs 18 in the concept drawing. It is assumed, for the purposes of this description that the x and y-axes of the three-dimensional coordinate system are the axes of the view plane and that the z-axis is the axis orthogonal to the view plane and in the view direction, where the positive z-direction is toward the viewer and the negative z-direction is away from the viewer. Accordingly, the x and y-axes of the tangent vectors to the cross-sections at the locations of the cross-hairs 18 in the concept drawings may be known and the block 206 optimization set up may be used to solve for the z-components of these tangent vectors.

A constrained optimization problem involves minimizing an objective function subject to one or more constraints. Accordingly, block 206 may involve configuring an objective function and/or one or more constraints. In some embodiments, the objective function and/or constraints may be pre-configured.

In some particular embodiments, the output of the constrained optimization comprises a set of parameters which define (in a three-dimensional coordinate system) one plane for each cross-sections 16 in the concept drawing, where each cross-section 16 lies on its corresponding plane. As is known, a plane can be described in a three-dimensional coordinate system by a normal vector n and an offset value c, where the normal vector n represents the orientation of the plane and c represents the location of the plane in the three-dimensional coordinate system (e.g. c may represent a closest distance from the origin of the three-dimensional coordinate system to the plane). The plane can then be described according to the plane equation:

$$x \cdot n + c = 0 \qquad (5)$$

where x is the position vector extending from the origin to a location (x,y,z) on the plane. Thus, in some embodiments, the optimization problem set up in block 206 comprises an optimization problem which determines the parameters $n_i$ (i.e. the cross-section normal for the plane corresponding to the $i^{th}$ cross-section 16) and $c_i$ (i.e. the offset value for the plane corresponding to the $i^{th}$ cross-section 16) for each of the cross-sections 16 in the concept drawing.

In some particular embodiments, the output of the constrained optimization comprises a set of parameters which define (in the three-dimensional coordinate system) $t_{ij}^z$ and $t_{ji}^z$ (i.e. the z-components of the tangent vectors $t_{ij}$ and $t_{ji}$ to the $i^{th}$ and $j^{th}$ cross-sections 16 at the location of cross-hair 18 corresponding to their intersection) for each of the cross-hairs 18 in the concept drawing. It will be appreciated that the x and y-components of the tangent vectors $t_{ij}$ and $t_{ji}$ may be known from the concept drawing input in block 202 or and/or from block 202 analysis discussed above.

In some particular embodiments, the objective function for the block 206 optimization problem set up is based at least in part on the observation of equation (3) (or the magnitudes of the equation (3) expressions) for each of the cross-hairs 18 in the concept drawing. In some particular embodiments, the objective function for the block 206 optimization problem set up is based at least in part on the observation of equation (4) over the cross-hairs 18 in the concept drawing. In some particular embodiments, the objective function of the block 206 optimization problem set up is based at least in part on both the magnitude of the equation (3) expressions and the observation of equation (4) over the cross-hairs in the concept drawing. For example, in such embodiments, the block 206 objective function comprises:

$$\text{obj. function} = f(|t_{ij} \times n_j|, |t_{ji} \times n_i|, (t_{ij}^z)^2 + (t_{ji}^z)^2) \qquad (6)$$

evaluated at each cross-hair 18 in the concept drawing. In some embodiments, the parameters $|t_{ij} \times n_j|$ and $|t_{ji} \times n_i|$ may be replaced by $|t_{ij} \times n_j|^2$ and $|t_{ji} \times n_i|^2$, where $|t_{ij} \times n_j|^2$ and $|t_{ji} \times n_i|^2$ represent different evaluations of the magnitude of the equation (3) expressions and which may reduce the need to compute square roots and the corresponding computational expense.

In some particular embodiments, the objective function of the block 206 optimization problem set up is based on a linear combination of the parameters $|t_{ij} \times n_j|$, $|t_{ji} \times n_i|$, $(t_{ij}^z)^2 + (t_{ji}^z)^2$ evaluated at each cross-hair 18 in the concept drawing or on a linear combination of the parameters $|t_{ij} \times n_j|^2$, $|t_{ji} \times n_i|^2$, $(t_{ij}^z)^2 + (t_{ji}^z)^2$ evaluated at each cross-hair 18 in the concept drawing. In some embodiments, such a linear combination can be expressed as:

$$\text{obj. function} = \Sigma_{ij}(a_{ij}|t_{ij} \times n_j|^2 + b_{ij}|t_{ji} \times n_i|^2 + d_{ij}[(t_{ij}^z)^2 + (t_{ji}^z)^2]) \qquad (7)$$

where the sum over ij represents the sum over each cross-hair 18 in the concept drawing and $a_{ij}$, $b_{ij}$, $d_{ij}$ represent configurable weighting coefficients. In some particular non-limiting embodiments, the inventors have achieved desirable results by setting $a_{ij}=b_{ij}=d_{ij}=1$ for all ij.

While a number of exemplary objective functions are described herein, it will be appreciated that other objective functions could be constructed which may be based at least in part on the observation of equation (3) (or the magnitudes of the equation (3) expressions) for each of the cross-hairs 18 in the concept drawing and/or on the observation of equation (4) over all of the cross-hairs 18 in the concept drawing. Embodiments of the invention should be understood to include any such objective functions.

In some particular embodiments, the constraints for the block 206 optimization problem set up are based at least in part on the block 204 characterization of the concept drawing. For example, in some embodiments the constraints for the block 206 optimization problem set up comprise:

$$|n_i \cdot n_j| \leq \varepsilon \text{ or } -\varepsilon \leq n_i \cdot n_j \leq \varepsilon \text{ for all } ij \qquad (1)$$

where $\varepsilon$ is a positive number close to zero and is a parameter which may be configurable and which may be used to accommodate error in the concept drawing. In some embodiments the constraints for the block 206 optimization problem set up additionally or alternatively comprise:

$$|t_{ij} \cdot t_{ji}| \leq \gamma \text{ or } -\gamma \leq t_{ij} \cdot t_{ji} \leq \gamma \text{ for all } ij \qquad (2)$$

where $\gamma$ is a positive number close to zero and is a parameter which may be configurable and which may be used to accommodate error in the concept drawing. The parameters $\varepsilon$ and $\gamma$ may be user-configurable depending on the confidence in the accuracy of the input concept drawings. In some embodiments, where the confidence in the accuracy of the input concept drawings is relatively low, the parameters $\varepsilon$ and $\gamma$ may be set to be in a range of 0.075-0.15. In some embodiments, where the confidence in the accuracy of the input concept drawings is relatively high, the parameters $\varepsilon$ and $\gamma$ may be set to be in a range of 0.025-0.075.

In some embodiments the constraints for the block 206 optimization problem set up additionally or alternatively comprise one or more geometric relationships, such as:

$$t_{ij} \cdot n_i = 0 \text{ for all } ij \qquad (8a)$$

and $$t_{ji} \cdot n_j = 0 \text{ for all } ij \qquad (8b)$$

These constraints arise directly out of the geometry. For example, the $i^{th}$ plane includes the $i^{th}$ cross-section 16 and therefore includes the tangent vector $t_{ij}$ at the location of the cross-hair 18 where the $i^{th}$ cross-section 16 intersects the $j^{th}$ cross-section 16 and the cross-section normal $n_i$ is orthogonal to the $i^{th}$ plane by definition.

In some embodiments, the block 206 optimization problem set up may involve making one or more assumptions that can reduce the computing resources required to perform the block 208 optimization. For example, normal vectors to planes (e.g. cross-section normal vectors $n_i$) are typically defined to have unit length. However, the inventors have found that it is more convenient in some circumstances to set the z-component (i.e. the view direction component) of the cross-section normal vectors $n_i$ to be of unit length (i.e. $n_i^z=1$) for all i. This assumption may reduce the complexity (e.g. the polynomial order) of one or more of the expressions in some block 206 optimization problem formulations or one or more terms in any such expressions. This assumption (i.e. setting $n_i^z=1$ for all i) works effectively where the planes which include cross-sections 16 of concept drawings are not orthogonal to the view plane (i.e. where the cross-sections 16 are not straight lines in the concept drawing).

In some embodiments, the block 206 optimization problem set up may take advantage of the fact that at the location of each cross-hair 18 in the three dimensional coordinate system, the three-dimensional representations of the cross-section curves 16 share the same z-component. Using this observation, the block 206 optimization problem set up may define an offset value c for each plane containing a cross-section 16 in the concept drawing, where the offset value $c_i$ represents a location of the $i^{th}$ plane in the three-dimensional coordinate system (e.g. $c_i$ may represent a closest distance from the origin of the three-dimensional coordinate system to the $i^{th}$ plane). Accordingly, for the $ij^{th}$ cross-hair 18 at a location $x=<x_x,x_y,x_z>$ in the three-dimensional coordinate system, the $i^{th}$ and $j^{th}$ planes at the cross-hair 18 may be defined by the plane equations:

$$x \cdot n_i + c_i = 0 \qquad (9a)$$

and $$x \cdot n_j + c_j = 0 \qquad (9b)$$

From the earlier block 206 assumption discussed above, $n_i^z=n_j^z=1$. Accordingly, equation (9b) can be subtracted from equation (9a) to yield:

$$x_x(n_i^x - n_j^x) + x_y(n_i^y - n_j^y) + (c_i - c_j) = 0 \qquad (10)$$

For each $ij^{th}$ cross-hair 18, equation (10) expresses the offset values $c_i$, $c_j$ of the corresponding $i^{th}$ and $j^{th}$ planes in terms of the x and y locations of the cross-hair 18 (which are known) and the cross-section normal vectors $n_i$, $n_j$. Accordingly, in some embodiments, equation (10) may be used as an additional constraint in the block 206 optimization problem set up. In some embodiments, equation (10) may be substituted into any of the objective function and/or the constraints of the block 206 optimization problem (e.g. to reduce the computational expense associated with the optimization problem). In some embodiments, block 206 may involve selecting one arbitrarily chosen cross-hair 18 to be the origin of the three-dimensional coordinate system (i.e. to have a location $x=<x_x,x_y,x_z>=<0,0,0>$ and the two corresponding planes to have offset values $c_i=c_j=0$.

Once the optimization problem has been set up in block 206, method proceeds to block 208 where the optimization is performed. In some embodiments, the block 208 optimization is performed using an interior point optimization algorithm. This is not generally necessary. Some embodiments may make use of additional or alternative optimization algorithms which are known or may become known to those skilled in the art. Suitable constrained optimization algorithms that may be used in block 208 include, without limitation, a variety of non-linear modern optimization techniques.

The block 208 optimization determines the cross-section normal vectors $n_i$ in a three-dimensional coordinate system for each cross-section 16 in the input concept drawing, where $n_i$ represents the cross-section normal vector for the $i^{th}$ plane which includes the $i^{th}$ cross-section 16. The block 208 optimization may also obtain the offset values $c_i$ in the three dimensional coordinate system for each cross-section 16 in the input concept drawing, where $c_i$ represents the offset value for the $i^{th}$ plane which includes the $i^{th}$ cross-section 16 (e.g. $c_i$ may represent a closest distance from the origin of the three-dimensional coordinate system to the $i^{th}$ plane). The block 208 optimization may also comprise determining a set of parameters which define (in the three-dimensional coordinate system) $t_{ij}^z$ and $t_{ji}^z$ (i.e. the z-components of the tangent vectors $t_{ij}$ and $t_{ji}$ to the $i^{th}$ and $j^{th}$ cross-sections 16 at the location of the cross-hair 18 corresponding to their intersection) for each of the cross-hairs 18 in the concept drawing. It will be appreciated that the x and y-components of the tangent vectors $t_{ij}$ and $t_{ji}$ may be known from the concept drawing input in block 202 or and/or from block 204 analysis discussed above. Further, it will be appreciated that $t_{ij}^z$ and $t_{ji}^z$ can be computed from knowledge of the cross-section normal vectors $n_i$ at each cross-hair 18. These outputs of the block 208 optimization process are shown in FIG. 2B as optimization outputs 270.

The block 208 optimization may involve determining an initial guess for the optimization process. In some embodiments, this initial guess may be performed as part of the block 206 optimization set up. This initial guess may be used to help ensure that the block 208 optimization yields a consistent set of cross-hair orientations. In some embodiments, this initial guess may comprise a set of solutions (e.g. $n_i$, $c_i$ and $t_{ij}^z$ and $t_{ji}^z$) for an initial pair of cross-hairs 18 and this information may specify the orientation at the initial pair of cross-hairs 18 to thereby remove the orientation ambiguity discussed above. In some embodiments, it is sufficient to specify a subset of the data for the initial pair of cross-hairs 18 as this initial guess. For example, it is not necessary in some embodiments to specify the offsets $c_i$. Further, if $n_i$ is known, then $t_{ij}^z$ and $t_{ji}^z$ may be determined from $n_i$ and vice versa. Consequently, in some embodiments, the initial guess at the initial pair of cross-hairs may comprise $n_i$ or $t_{ij}^z$ and $t_{ji}^z$. In some embodiments, the initial guess at the initial pair of cross-hairs may comprise $c_i$ and one of: $n_i$ or $t_{ij}^z$ and $t_{ji}^z$. For each of the initial pair of cross-hairs 18, determining the initial guess may involve: analytically minimizing foreshortening at the initial cross-hair 18 (e.g. analytically minimizing $(t_{ij}^z)^2+(t_{ji}^z)^2$ for the initial cross-hair 18 by setting this expression to be equal to zero), while strictly enforcing the other properties (e.g. requiring that for the initial cross-hair 18: $n_i \cdot n_j = 0$; $t_{ij} \cdot t_{ji} = 0$; $t_{ij} \times n_j = 0$; and $t_{ji} \times n_i = 0$) and assuming that the initial cross-hair is independent of any other cross-hairs (e.g. that values are zero for all other cross-hairs). Such analytic solutions are obtained for a pair of initial cross-hairs 18.

It will be appreciated that the above-described technique for determining the initial guesses at the initial cross-hairs 18 may yield two solutions (where the surface normal faces the viewer) for each initial cross-hair 18, since there is orientational ambiguity associated with the initial cross-hairs 18 as discussed above. In circumstances where a cross-section 16 intersects a silhouette 12, this orientational ambiguity may be removed by selecting initial cross-hairs 18 which are closest to the intersection of the cross-section 16 and the silhouette 12 and selecting (as initial guesses) the solutions which are consistent with the orientation of the tangent $t_s$ in the immediate vicinity of the silhouette 12, as described above (see FIG. 3F and block 116 characterization property (FIG. 3A)).

In circumstances where there is no intersection between a silhouette 12 and a cross-section 16, then the two initial cross-hairs 18 may be selected to be far apart from one another. Since there will be two solutions for each of the initial cross-hairs 18 and there are two initial cross-hairs 18, there will be a total of four combinations of initial guesses. In such cases, block 208 may comprise performing the optimization for all four combinations of initial guesses and then selecting the solution that is most consistent with typical viewer perceptions. Typically, viewer perceptions have been studied and it has been found that, on average, viewers prefer interpretations consistent with viewing objects from above and/or with convex shapes (as opposed to concave shapes). Additionally or alternatively, user-selection may be solicited to enforce an orientation. Such user selection may involve selecting one or more of the orientation(s) of the initial guesses at the initial cross-hairs 18 and/or selecting between the solutions generated by the four combinations of initial guesses.

At the conclusion of the block 208 optimization process, the illustrated embodiment of method 200 has determined: the cross-section normal vectors $n_i$ in a three-dimensional coordinate system for each cross-section 16 in the input concept drawing, where $n_i$ represents the cross-section normal vector for the $i^{th}$ plane which includes the $i^{th}$ cross-section 16; the offset values $c_i$ in the three dimensional coordinate system for each cross-section 16 in the input concept drawing, where $c_i$ represents the offset value for the $i^{th}$ plane which includes the $i^{th}$ cross-section 16; and $t_{ij}^z$ and $t_{ji}^z$ (i.e. the z-components of the tangent vectors $t_{ij}$ and $t_{ji}$ to the $i^{th}$ and $j^{th}$ cross-sections 16 at the location of the cross-hair 18 corresponding to their intersection) for each of the cross-hairs 18 in the concept drawing. It will be appreciated that the x and y-components of the tangent vectors $t_{ij}$ and $t_{ji}$ (i.e. $t_{ij}^x$ and $t_{ji}^x$ and $t_{ij}^y$ and $t_{ji}^y$) may be known from the concept drawing input in block 202 or and/or from block 204 analysis discussed above. Further, it will be appreciated that $t_{ij}^z$ and $t_{ji}^z$ can be computed from knowledge of the cross-section normal vectors $n_i$ at each cross-hair 18. These outputs of the block 208 optimization process are shown in FIG. 2B as optimization outputs 270.

Method 200 then proceeds to block 210 which involves generating a normal vector field comprising a plurality of cross-hair surface normal vectors in the three-dimensional coordinate system. Each cross-hair surface normal vector $n_{ij}$ generated in block 210 is located at the location, in the three-dimensional coordinate system, of the $ij^{th}$ cross-hair where the $i^{th}$ one of the cross-sections intersects the $j^{th}$ one of the cross-sections and is estimated to be oriented orthogonally to the surface of the object underlying the concept drawing at the location of the $ij^{th}$ cross-hair. Generating the cross-hair surface normal vectors may be based at least in part on one or more of: the plurality of cross-section normal vectors (e.g. $n_i$), the plurality of tangent vectors (e.g. $t_{ij}$ and $t_{ji}$) and the plurality of offset values $c_i$. In some embodiments, for each cross-hair 18, the cross-hair surface normal vector $n_{ij}$ at the location of the $ij^{th}$ cross-hair 18 can be determined in block 210 from the tangent vectors $t_{ij}$ and $t_{ji}$ at the location of the $ij^{th}$ cross-hair 18 according to:

$$n_{ij} = t_{ij} \times t_{ji} \qquad (11)$$

The output 280 of block 210 is a field of surface normal vectors $n_{ij}$ at the locations of cross-hairs 18 in the three-dimensional coordinate system and estimated to be orthogonal to the surface of the object underlying the concept drawing. These output surface normal vectors $n_{ij}$ at the locations of cross-hairs 18 are shown in FIG. 2C as output 280.

Once the surface normal vectors $n_{ij}$ are determined at the locations of cross-hairs 18 in block 210, then method 200 may optionally involve propagating the cross-hair surface normal vectors to locations away from cross-hairs 18 (e.g. to further populate the normal vector field at locations away from cross-hairs 18). It can be desirable to further populate the normal vector field at locations away from cross-hairs 18 to provide further indicators of three-dimensional information corresponding to the object underlying the concept drawing.

Figure 4:
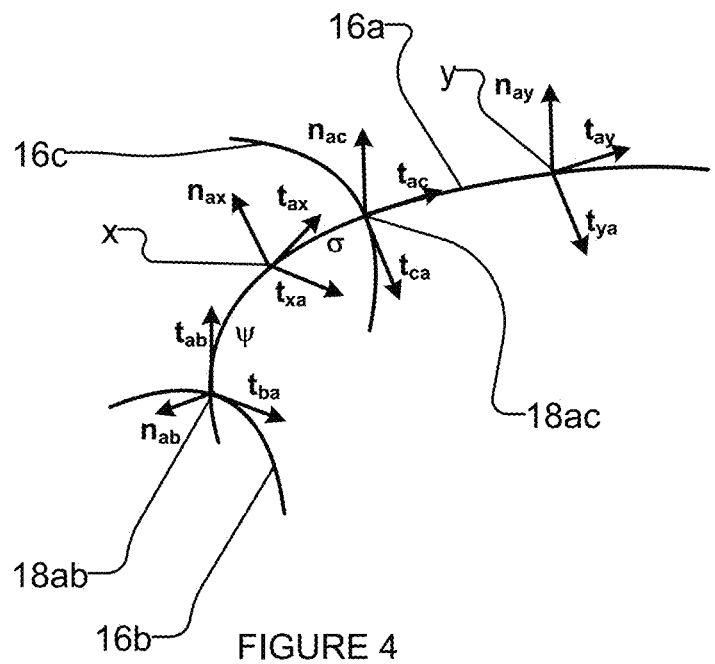
FIG. 4 is an illustrative drawing showing how surface normal vectors may be propagated along a cross-section.

In the illustrated embodiment, the surface normal vectors $n_{ij}$ at the locations of cross-hairs 18 may first be propagated along cross-sections 16 in block 212. A graphical illustration of this block 212 process is shown process is shown in FIG. 4. FIG. 4 shows three cross-sections 16*a*, 16*b* and 16*c* with two cross-hairs 18*ab*, 18*ac*, where cross-hair 18*ab* represents the cross-hair between cross-sections 16*a*, 16*b* and cross-hair 18*ac* represents the cross-hair between cross-sections 16*a*, 16*c*. FIG. 4 also shows a location x on cross-section 16*a* that is located between cross-hairs 18*ab*, 18*ac*. FIG. 4 shows the following vectors at the location of cross-hair 18*ab*:

$t_{ab}$ which is the tangent along cross-section 16*a*;
$t_{ba}$ which is the tangent along cross-section 16*b*; and
$n_{ab}=t_{ab} \times t_{ba}$ which is the cross-hair surface normal vector.

These vectors at cross-hair 18*ab* are known from the preceding blocks of method 200. FIG. 4 also shows the following vectors at the location of cross-hair 18*ac*:

$t_{ac}$ which is the tangent along cross-section 16*a*;
$t_{ca}$ which is the tangent along cross-section 16*c*; and
$n_{ac}=t_{ac} \times t_{ca}$ which is the cross-hair surface normal vector.

Again, these vectors at cross-hair 18*ac* are known from the preceding blocks of method 200.

The surface normal vector propagation of block 212 may involve determining the following vectors at the location x between cross-hairs 18*ab*, 18*ac* on cross-section 16*a*:

$t_{ax}$ which is the tangent along cross-section 16*a*;
$t_{xa}$ which is estimated to be another tangent to the surface of the object underlying the concept drawing; and
$n_{ax}$ which is estimated to be a surface normal vector on the surface of the object underlying the concept drawing.

The tangent vector $t_{ax}$ is known or determinable from the knowledge of the two-dimensional cross-section 16*a* and from the three-dimensional knowledge of the $a^{th}$ plane which includes the cross-section 16*a*. In some embodiments, the vector $t_{xa}$ is determined in block 212 according to an arc-length based weighted average of $t_{ba}$ and $t_{ca}$. In one particular embodiment, the vector $t_{xa}$ is determined in block 212 according to:

$$t_{xa} = \frac{\sigma t_{ba} + \psi t_{ca}}{\psi + \sigma} \quad (12)$$

where $\Psi$ is an arc length along cross-section 16*a* between cross-hair 18*ab* and point x and $\sigma$ is an arc length along cross-section 16*a* between cross-hair 18*ac* and point x. In some embodiments, the arc length is normalized, such that $\Psi+\sigma=1$, in which case equation (12) can be reduced to $t_{xa}=\sigma t_{ba}+(1-\sigma)t_{ca}$. Once $t_{xa}$ is determined, then the surface normal vector $n_{ax}$ can be determined according to $n_{ax}=t_{ax} \times t_{xa}$.

It will be appreciated that the location x is an arbitrary location on a cross-section 16*a* between two cross-hairs 18*ab*, 18*ac* and so block 212 may involve determining surface normal vectors at a plurality of locations x along cross-section 16*a*. For example, block 212 may determine surface normal vectors at any suitable spacing (e.g. any suitable arc length spacing) along cross-section 16*a* as may be desired or required for a particular application. Also, it will be appreciated that cross-section 16*a* and cross-hairs 18*ab*, 18*ac* are arbitrary and so block 212 may involve determining surface normal vectors on any or all of the cross-sections 16 in a concept drawing at any locations between pairs of cross-hairs 18.

Block 212 may also involve determining surface normal vectors at locations along a cross-section 16 that are not between cross-hairs 18. This situation is shown in FIG. 4 at a location y which is also on cross-section 16*a*, but is not between cross-hairs 18. In this situation, the vectors at the nearest cross-hair 18*ac* can be used to determine the surface normal vector $n_{ay}$ at location y by determining $n_{ay}=t_{ay} \times t_{ya}$, where $t_{ay}$ is known or determinable from the knowledge of the two-dimensional cross-section 16*a* and from the three-dimensional knowledge of the $a^{th}$ plane which includes the cross-section 16*a* and where $t_{ya}$ at location y is assumed to be the same as $t_{ca}$ at the location of the nearest cross-hair 18*ac*. Again, it will be appreciated that the location y as well as the cross-section 16*a* and cross-hair 18*ac* are arbitrary, so block 212 may use this technique to determine surface normal vectors for any locations which are not between pairs of cross-hairs 18 on any or all of the cross-sections 16 in a concept drawing.

The output 285 of block 212 is a field of surface normal vectors in the three-dimensional coordinate system at a plurality of locations along the cross-sections 16 of the concept drawing (shown in FIG. 2B as surface normal vectors 285), where the surface normal vectors are estimated to be orthogonal to the surface of the object underlying the concept drawing.

Method 200 may then proceed to optional block 214 which involves further populating the surface normal vector field by determining surface normal vectors in locations between cross-sections 16 or otherwise not on cross-sections 16. FIG. 5A illustrates a block diagram of a method 500 for determining surface normal vectors in locations between cross-sections 16 or otherwise not on cross-sections 16 of concept drawing 10 which may be used to implement block 214 according to a particular embodiment. In accordance with method 500, the locations for which surface normal vectors are determined are the two-dimensional locations on the view plane (e.g. the x-y plane using the notation of this description), although the surface normal vectors themselves are three-dimensional vectors in the three-dimensional coordinate system. The locations of known surface normal vectors at locations in the three-dimensional coordinate system (e.g. surface normal vectors at cross-hairs and along cross-sections) can be projected back to the view plane by removing their depth (e.g. z coordinate).

The particular embodiment shown in method 500 involves the application of the so-called Coons interpolation technique using discrete bi-linearly blended Coons patches as described by Farin, G. and Hansford, D. 1999. Discrete Coons Patches. *Computer Aided Geometric Design* 16 (August), 691-700, which is hereby incorporated herein by reference. This Coons patches technique is used on a region bounded by four curves, where a discrete set of normal vectors are defined at discrete locations along each curve. To apply this Coons patches technique, method 500 first involves processing the information known from the rest of method 200 to obtain suitable regions for the application the Coons patches technique.

Method 500 starts in block 502 which involves extending "hanging" cross-sections 16 until they intersect a boundary curve (e.g. a silhouette 12 or a sharp boundary 14—see FIG. 1). A hanging cross-section 16 is a cross-section that terminates at a location other than on a boundary curve. In one particular embodiment, extending a hanging cross-section 16 in block 502 involves extending the hanging cross-section 16 to the nearest silhouette 12 or sharp boundary 14, where such extending is in the direction of the tangent vector to that cross-section 16 at its terminus. As discussed above, the tangent vectors to cross-sections 16 are known or determinable at all locations on cross-sections 16. Method 500 then proceeds to block 504 which involves determining a plurality of regions that are bounded by curves (either by cross-sections 16 or cross-sections 16 in combination with boundary curves (i.e. silhouettes 12 or sharp boundaries 14). Such regions can be extracted, for example, by creating a planar map of the curves.

Method 500 then proceeds to block 506 which involves further processing the block 506 regions, if necessary, to set up the region for application of the discrete Coons patches interpolation. Block 506 may involve classifying the block 504 regions into one of a number of classification types and then processing each region in accordance with its classification type to provide a region having characteristics suitable for application of the discrete Coons patches interpolation. The block 506 classification may involve an analysis of the types of curves that bound the region. In one particular embodiment, the block 506 may include the following classification types:

Type I: regions bounded by four cross-sections 16;
Type II: regions bounded by a number n of cross-sections 16, where n≠4;
Type III: regions bounded by more than 3 consecutive cross-sections 16 and by a boundary curve (e.g. a silhouette 12 or a sharp boundary 14);
Type IV: regions bounded by 2 or 3 consecutive cross-sections 16 and by boundary curves.

The regions in type I are bounded by four cross-sections 16 on which surface normal vectors are known (by the earlier operations of method 200). Consequently, type I regions are suitable for the application of Coons patches interpolation without further processing in block 506. In accordance with method 500 of the FIG. 5A embodiment, Coons patches interpolation is applied to the type I regions in block 508 to propagate surface normal vectors to the interior of the type I regions.

The regions of type II are bounded by a number n of cross-sections 16 on which surface normal vectors are known, where n≠4. In one particular embodiment, type II regions are processed in block 506 to apply a midpoint subdivision of the type II region to generate n four-"sided" sub-regions. This process is schematically depicted in FIG. 5B, where a three-sided type II region 520 is subdivided into three four-sided sub-regions 522A, 522B, 522C. The location of the midpoint 524 of the inserted sub-region boundaries 526 may be selected in accordance with templates of the type described by Nasri A. et al. 2009. Filling N-Sided Regions by Quad Meshes for Subdivision Surfaces. *Computer Graphics Forum* 28, 6 (September), 1644-1658 which is hereby incorporated herein by reference. Surface normal vectors may be assigned to the inserted sub-region boundaries 526 using the discrete Coons formulation described by Farin, G. and Hansford, D. 1999, treating adjacent sub-regions 522 as a single four-sided region. Once surface normal vectors are defined on the inserted sub-region boundaries 526, then each sub-region 522 can be processed by application of Coons patches interpolation (in block 508) to propagate surface normal vectors to the interior of sub-region 522.

The regions of type II are bounded by more than 3 consecutive cross-sections 16 and by a boundary curve (e.g. a silhouette 12 or a sharp boundary 14). In their initial form, type III regions are unsuitable for the application of Coons patches interpolation because there are no surface normal vectors defined on the boundary curve. In one particular embodiment, the type III regions are processed in block 506 to estimate surface normal vectors on the boundary curve by copying normal vectors from one or more opposing (i.e. non-adjacent) cross-sections 16 onto the boundary curve and then rotating the copied normal vectors on the boundary curve to agree with the normal vectors of adjacent cross-sections 16 at the extremities of the boundary curve. This process is shown schematically in FIG. 5C, where a type III region is bounded by four consecutive cross-sections 16 on which surface normal vectors are known and includes a boundary curve (e.g. a sharp boundary 14) which initially has no surface normal vectors. The middle illustration of FIG. 5C shows how normal vectors from the opposing cross-sections are copied onto sharp boundary 14. Then, the rightmost illustration of FIG. 5C shows how the normal vectors copied onto sharp boundary 14 are rotated, to agree with the normal vectors of the adjacent cross-sections 16 at the extremities of sharp boundary 14. Normal vectors on the interior of the sharp boundary 14 (i.e. between the extremities of sharp boundary 14), may be rotated based on an arc-length weighted average between the rotations at the extremities of sharp boundary 14. This process can also be used where the boundary curve is a silhouette 12. However, where the boundary curve of a type III region is a silhouette 12, another embodiment for determining the normal vectors on the silhouette 12 comprises computing normal vectors from the normal vectors to the two-dimensional curve of the silhouette 12, since, for silhouettes 12, their two-dimensional normal vectors correspond to the normal vectors in the three-dimensional coordinate system.

Since the initial type II region has more than three (i.e. four or more) consecutive cross-sections 16, once the normal vectors are defined on the boundary curve, the type III region will be bounded by more than four curves on which normal vectors are defined. Thus, the type III region may be further processed in a manner similar to that discussed above for the type II region to reduce the type III region to a plurality of four-sided sub-regions. Once divided into four-sided sub-regions, these four-sided sub-regions can be processed by application of Coons patches interpolation (in block 508) to propagate surface normal vectors to the interior of the sub-regions.

The regions of type IV are bounded by 2 or 3 consecutive cross-sections 16 and by one or more boundary curves (e.g. silhouettes 12 or sharp boundaries 14). In their initial form, type IV regions are unsuitable for the application of Coons patches interpolation because there are no surface normal vectors defined on the boundary curve. In one particular embodiment, the type IV regions are processed in block 506 to generate an expanded four-sided region that overlaps the boundary curve and to define surface normal vectors on the newly created boundaries of the expanded four-sided region. Coons patches interpolation may then be applied to the expanded four-sided region in block 508. The expanded four-side region may then be post processed in block 510 (FIG. 5A) to remove the extraneous parts—i.e. the parts of the expanded region outside of the original type IV region. This process is shown schematically in FIG. 5D, where a type IV region 540 is bounded by two consecutive cross-sections 16 on which surface normal vectors are known and includes a boundary curve (e.g. a silhouette 12) which initially has no surface normal vectors. In the illustrated FIG. 5D embodiment, an expanded four-sided region 542 is created by: extending cross-sections 16 along at their extremities along directions indicated by their known tangents at their extremities to produce extended cross-sections 16'; creating the four-sided expanded region 542 by creating synthetic curves 16" at the extremities of the their adjacent extended cross-sections 16' and having curvatures similar to their opposing extended cross-sections 16'; and then estimating normal vectors along synthetic curves 16" by: copying the normal vectors from the known (non-adjacent) cross-section curves 16 onto the synthetic curves 16", rotating the normal vectors at the extremities of the synthetic curves 16" to make the normal vectors at the extremities of synthetic curves 16" agree with the normal vectors of extended cross-sections 16' and performing an arc-length weighted average rotation on the normal vectors between the extremities of synthetic curves 16". Once the surface normal vectors are known on the four-sided expanded region 542, then Coons patches interpolation may then be applied to the expanded four-sided region in block 508. The expanded four-side region may then be post processed in block 510 (FIG. 5A) to remove the extraneous parts—i.e. the parts of the expanded region 542 outside of the original type IV region 540. The remaining interpolated surface normal vectors in the original type IV region 540 may then provide the surface normal vectors representing the output of method 500 (block 214).

Returning to FIG. 2B, the output 290 of block 214 is a field of three-dimensional surface normal vectors that are defined at suitably quantized locations on the view plane and within the boundary curves (silhouettes 12 or sharp boundaries 14) of the concept drawing. These surface normal vectors as shown in FIG. 2B as output surface normal vectors 290. The specific surface normal vectors generated in block 214 are located away from the cross-sections. The surface normal vectors 290 are estimated to be orthogonal to the surface of the object underlying the concept drawing.

Method 200 may proceed to optional block 216 which may involve using further processing based on any of: output 270 of block 208 (e.g. cross-section normal vectors and offsets which define the three-dimensional planes that include cross-sections 16 and the three-dimensional tangent vectors at the cross-hairs 18), output 280 of block 210 (e.g. surface normal vectors at the locations of cross-hairs 18), output 285 of block 212 (e.g. surface normal vectors at suitably quantized locations along cross-sections 16) and/or output 290 of block 214 (e.g. surface normal vectors at locations other than on cross-sections 16). The further processing in optional block 216 may produce its own output 295 as shown in FIG. 2B. By way of non-limiting example, such optional block 216 further processing may involve application of shading to the concept drawing based on the surface normal vector field output 280, 285, 290 from blocks 210, 212 and/or 214. Techniques for generating such shading based on surface normal vector fields (e.g. Phong shading and/or the like) are known in the art. Other non-limiting examples of further processing that could be performed in optional block 216 include: constructing a partial three-dimensional model of the object underlying the block 202 input concept drawing 10; three-dimensional layering of two-dimensional concept drawings onto one another to respect surface depth and orientation; generating stereoscopic images of the object underlying the block 202 input concept drawing 10; three-dimensional presentation renderings of the object underlying the block 202 input concept drawing 10; combining the outputs of multiple iterations of method 200; and/or the like.

One aspect of the invention provides a method for generating shading to provide three-dimensional appearance to an object underlying a concept drawing. FIG. 2C is a block diagram of a method 300 for generating a normal vector field that represents a surface of an object underlying a concept drawing and generating representative shading for the object underlying the concept drawing based on the surface normal vector field according to a particular embodiment. Method 300 is implemented, at least in part, by one or more computers or suitably configured processors 350—shown in dashed lines in FIG. 2C. Method 300 starts in block 302 which involve procuring a concept drawing 10. Block 302 may be substantially similar to blocks 102, 202 described above. Method 300 then proceeds to block 304 which involves determining estimates of the surface normal vectors 320 of the object underlying the block 302 concept drawing. These surface normal vectors 320 may be determined in block 304 in accordance with method 200 (e.g. blocks 204-214) described above. Method 300 then proceeds to block 306 which involves generating shading information 330 for concept drawing 10 using the block 304 surface normal vectors 320. Techniques for generating such shading based on surface normal vector fields (e.g. Phong shading and/or the like) are known in the art.

Another aspect of the invention provides a method for characterizing an object underlying a concept drawing, the concept drawing comprising a plurality of cross-sections and a plurality of cross-hairs, each cross-hair comprising an intersection of two corresponding cross-sections. The characterization method comprises determining parameters for a plurality of planes in a three-dimensional coordinate system, each of the planes including a corresponding one of the cross-sections. The characterization method may optionally involve determining an estimate of the curves of the cross-sections in the three-dimensional coordinate system wherein the curve for each cross-section in the three-dimensional coordinate system is located on the plane corresponding to the cross-section. The characterization method is implemented, at least in part, by one or more computers or suitably configured processors. The method comprises performing a constrained optimization which minimizes an objective function subject to one or more constraints to solve for a plurality of cross-section normal vectors, each cross-section normal vector $n_i$ corresponding to an $i^{th}$ one of the cross-sections and normal to an $i^{th}$ plane defined in a three-dimensional coordinate system and such that the $i^{th}$ plane includes the $i^{th}$ one of the cross-sections; a plurality of tangent vectors in the three-dimensional coordinate system, each tangent vector $t_{ij}$ corresponding to an $ij^{th}$ one of the cross-hairs and comprising a tangent to the $i^{th}$ one of the cross-sections at a location, in the three-dimensional coordinate system, of the $ij^{th}$ cross-hair where the $i^{th}$ one of the cross-sections intersects the $j^{th}$ one of the cross-sections; and a plurality of offset values, each offset value $c_i$ representing a location of the $i^{th}$ plane in the three-dimensional coordinate system (e.g. $c_i$ may represent a closest distance from the origin of the three-dimensional coordinate system to the $i^{th}$ plane). One particular embodiment of this aspect of the invention may be implemented by performing the procedures of blocks 202-210 of method 200 described above to generate output 270 described above or a subset of output 270 described above.

Certain implementations of the invention comprise systems comprising one or more computers or suitably configured processors which execute software instructions which cause the processors to perform at least part of one or more methods of the invention. For example, a system may comprise one or more computers or suitably configured processors that implement methods as described herein (or parts thereof) by executing software instructions from a program memory accessible to the computers and/or processors. The invention may also be provided in the form of a program product. The program product may comprise any medium which carries a set of computer-readable data comprising instructions which, when executed by a data processor, cause the data processor to execute a method of the invention. Program products according to the invention may be in any of a wide variety of forms. The program product may comprise, for example, physical media such as solid state memory, magnetic data storage media including floppy diskettes, hard disk drives, optical data storage media including CD ROMs, DVDs, electronic data storage media including ROMs, flash RAM, or the like. The computer-readable data on the program product may optionally be compressed or encrypted.

Where a component (e.g. a controller, computer, processor, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

While a number of exemplary aspects and embodiments are discussed herein, those of skill in the art will recognize certain modifications, permutations, additions and sub-combinations thereof. For example:

A number of functionalities are described as applying to each or all of the cross-sections and/or cross-hairs in a concept drawing. This is not absolutely necessary. In some embodiments, the number of cross-sections and/or cross-hairs in a concept drawing can be suitably reduced (e.g. to minimize computational resources used to perform the methods described herein and/or to remove problematic cross-sections and/or cross-hairs which may lead to artifacts). In other embodiments, the methods described herein (and/or some of the steps of the methods described herein) may be practiced over a subset of the available cross-sections or cross-hairs.

It will be appreciated that the description provided herein and the accompanying claims refer to various coordinate system axes and directions. These axes and directions are merely labels and the coordinate system axes and directions may be rotated while remaining within the scope of the invention.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A computer-implemented method for characterizing an arbitrary three-dimensional object underlying a two-dimensional concept drawing, the method comprising:
    obtaining, as input at a computer system, a two-dimensional concept drawing comprising a two-dimensional computer representation of an arbitrary three-dimensional object underlying the concept drawing, the concept drawing comprising as input a plurality of two-dimensional non-parallel cross-sections which intersect at one or more cross-hairs and saving the two-dimensional concept drawing in a memory accessible to the computer system;
    determining, by the computer system, a three-dimensional vector field computer representation corresponding to the arbitrary three-dimensional object underlying the concept drawing and saving the three-dimensional vector field in the memory accessible to the computer system, the three-dimensional vector field comprising a plurality of three-dimensional vectors;
    wherein determining the three-dimensional vector field comprises determining, by the computer system, for each cross-section:
        a corresponding plane on which the cross-section is located, the plane having a normal vector n in a three-dimensional coordinate system; and
        for each cross-hair on the cross-section, a tangent vector t in the three-dimensional coordinate system which is tangent to the cross-section at the cross-hair;
    wherein, for each cross-hair comprising $i^{th}$ and $j^{th}$ intersecting cross-sections, one or more constraints are satisfied, the one or more constraints comprising:
        the normal vector $n_i$ of the plane on which the $i^{th}$ cross-section is located is at least approximately orthogonal to the normal vector $n_j$ of the plane on which the $j^{th}$ cross-section is located; and
        the tangent vector $t_{ij}$ to the $i^{th}$ cross-section at the cross-hair is at least approximately orthogonal to the tangent vector $t_{ji}$ to the $j^{th}$ cross-section at the cross-hair utilizing said three-dimensional vector field in the characterization of said three-dimensional object.

2. A computer-implemented method for characterizing a three-dimensional object underlying a two-dimensional concept drawing, the method comprising:
    obtaining, at a computer system, a two-dimensional concept drawing comprising a two-dimensional computer representation of a three-dimensional object underlying the concept drawing, the concept drawing comprising a plurality of two-dimensional cross-sections which intersect at one or more cross-hairs and saving the two-dimensional concept drawing in a memory accessible to the computer system;
    determining, by the computer system, a three-dimensional vector field computer representation corresponding to the three-dimensional object underlying the concept drawing and saving the three-dimensional vector field in the memory accessible to the computer system, the three-dimensional vector field comprising a plurality of three-dimensional vectors;
    wherein determining the three-dimensional vector field comprises determining, by the computer system, for each cross-section:
        a corresponding plane on which the cross-section is located, the plane having a normal vector n in a three-dimensional coordinate system; and
        for each cross-hair on the cross-section, a tangent vector t in the three-dimensional coordinate system which is tangent to the cross-section at the cross-hair;
    wherein, for each cross-hair comprising $i^{th}$ and $j^{th}$ intersecting cross-sections, one or more constraints are satisfied, the one or more constraints comprising:
        the normal vector $n_i$ of the plane on which the $i^{th}$ cross-section is located is at least approximately orthogonal to the normal vector $n_j$ of the plane on which the $j^{th}$ cross-section is located; and
        the tangent vector $t_{ij}$ to the $i^{th}$ cross-section at the cross-hair is at least approximately orthogonal to the tangent vector $t_{ji}$ to the $j^{th}$ cross-section at the cross-hair;

wherein, for each cross-hair comprising $i^{th}$ and $j^{th}$ intersecting cross-sections, the one or more constraints comprising the normal vector $n_i$ of the plane corresponding to the $i^{th}$ cross-section is at least approximately orthogonal to the normal vector $n_j$ of the plane corresponding to the $j^{th}$ cross-section comprises $\|n_i \cdot n_j\| \leq \varepsilon$, where $\varepsilon$ is a positive number close to zero and is a parameter used to accommodate error in the concept drawing utilizing said three-dimensional vector field in the characterization of said three-dimensional object.

3. A computer-implemented method for characterizing a three-dimensional object underlying a two-dimensional concept drawing, the method comprising:

obtaining, at a computer system, a two-dimensional concept drawing comprising a two-dimensional computer representation of a three-dimensional object underlying the concept drawing, the concept drawing comprising a plurality of two-dimensional cross-sections which intersect at one or more cross-hairs and saving the two-dimensional concept drawing in a memory accessible to the computer system;

determining, by the computer system, a three-dimensional vector field computer representation corresponding to the three-dimensional object underlying the concept drawing and saving the three-dimensional vector field in the memory accessible to the computer system, the three-dimensional vector field comprising a plurality of three-dimensional vectors;

wherein determining the three-dimensional vector field comprises determining, by the computer system, for each cross-section:

a corresponding plane on which the cross-section is located, the plane having a normal vector n in a three-dimensional coordinate system; and for each cross-hair on the cross-section, a tangent vector t in the three-dimensional coordinate system which is tangent to the cross-section at the cross-hair;

wherein, for each cross-hair comprising $i^{th}$ and $j^{th}$ intersecting cross-sections, one or more constraints are satisfied, the one or more constraints comprising:

the normal vector $n_i$ of the plane on which the $i^{th}$ cross-section is located is at least approximately orthogonal to the normal vector $n_j$ of the plane on which the $j^{th}$ cross-section is located; and the tangent vector $t_{ij}$ to the $i^{th}$ cross-section at the cross-hair is at least approximately orthogonal to the tangent vector $t_{ji}$ to the $j^{th}$ cross-section at the cross-hair;

wherein, for each cross-hair comprising $i^{th}$ and $j^{th}$ intersecting cross-sections, the one or more constraints comprising the tangent vector $t_{ij}$ to the $i^{th}$ cross-section at the cross-hair is at least approximately orthogonal to the tangent vector $t_{ji}$ of the $j^{th}$ cross-section at the cross-hair comprises $\|t_{ij} \cdot t_{ji}\| \leq \gamma$, where $\gamma$ is a positive number close to zero and is a parameter used to accommodate error in the concept drawing utilizing said three-dimensional vector field in the characterization of said three-dimensional object.

4. A method according to claim 1 comprising performing a constrained optimization which comprises minimizing an objective function subject to the one or more constraints to thereby determine, for each cross-section: a normal vector n for the corresponding plane on which the cross-section is located; and, for each cross-hair on the cross-section, a tangent vector t which is tangent to the cross-section at the cross-hair.

5. A method according to claim 1 wherein determining, for each cross-section, the corresponding plane on which the cross-section is located comprises determining, for each plane an offset parameter $c_i$, the offset parameter $c_i$ representing a location of the plane in the three-dimensional coordinate system.

6. A method according to claim 5 comprising performing a constrained optimization which comprises minimizing an objective function subject to the one or more constraints to thereby determine, for each cross-section: the corresponding plane on which the cross-section is located, the plane having a normal vector n and an offset parameter $c_i$; and, for each cross-hair on the cross-section, a tangent vector t which is tangent to the cross-section at the cross-hair.

7. A method according to claim 1 wherein, for each cross-hair comprising $i^{th}$ and $j^{th}$ intersecting cross-sections, the one or more constraints comprise: the normal vector $n_i$ of the plane on which the $i^{th}$ cross-section is located is orthogonal to the tangent vector $t_{ij}$ to the $i^{th}$ cross-section at the cross-hair.

8. A method according to claim 1 wherein determining, for each cross-section and for each cross-hair on the cross-section, the tangent vector t comprises, if multiple tangent vectors t satisfy the constraints of the method, selecting values for the tangent vectors t which are consistent with the view from above.

9. A method according to claim 1 wherein determining the three-dimensional vector field further comprises, for each cross-hair comprising $i^{th}$ and $j^{th}$ intersecting cross-sections, generating a corresponding cross-hair surface normal vector $n_{ij}$ characterizing a surface of the arbitrary three-dimensional object underlying the concept drawing in the three-dimensional coordinate system, wherein generating the corresponding cross-hair surface normal vector is based on the tangent vector $t_{ij}$ to the $i^{th}$ cross-section at the cross-hair and the tangent vector $t_{ji}$ to the $j^{th}$ cross-section at the cross-hair.

10. A method according to claim 9 wherein determining the three-dimensional vector field further comprises propagating the cross-hair surface normal vectors to locations away from the cross-hairs.

11. A method according to claim 10 wherein propagating the cross-hair surface normal vectors comprises, for each cross-hair comprising $i^{th}$ and $j^{th}$ intersecting cross-sections, generating a plurality f cross-section surface normal vectors along at least a portion of the $i^{th}$ and $j^{th}$ cross-sections, the cross-section surface normal vectors based at least in part on one or more of: the corresponding cross-hair surface normal vector $n_{ij}$, the tangent vector $t_{ij}$ to the $i^{th}$ cross-section at the cross-hair and the tangent vector $t_{ji}$ to the $j^{th}$ cross-section at the cross-hair.

12. A method according to claim 1 wherein determining the three-dimensional vector field further comprises: generating a plurality of surface normal vectors characterizing the arbitrary three-dimensional object underlying the concept drawing in the three-dimensional coordinate system, generating the plurality of surface normal vectors based at least in part on one or more of: one or more of the normal vectors n and one or more of the tangent vectors t.

13. A method according to claim 12 comprising shading the concept drawing based at least in part on the plurality of surface normal vectors.

14. A computer-implemented method for characterizing a three-dimensional object underlying a two-dimensional concept drawing, the method comprising:

obtaining, at a computer system, a two-dimensional concept drawing comprising a two-dimensional computer representation of a three-dimensional object underlying the concept drawing, the concept drawing comprising a plurality of two-dimensional cross-sections which intersect at one or more cross-hairs and saving the two-dimensional concept drawing in a memory accessible to the computer system;

determining, by the computer system, a three-dimensional vector field computer representation corresponding to the three-dimensional object underlying the concept drawing and the three-dimensional vector field in the memory accessible to the computer system, the three-dimensional vector field comprising a plurality of three-dimensional vectors;

wherein determining the three-dimensional vector field comprises determining, by the computer system, for each cross-section:
   a corresponding plane on which the cross-section is located, the plane having a normal vector n in a three-dimensional coordinate system; and
   for each cross-hair on the cross-section, a tangent vector t in the three-dimensional coordinate system which is tangent to the cross-section at the cross-hair;

wherein, for each cross-hair comprising $i^{th}$ and $j^{th}$ intersecting cross-sections, one or more constraints are satisfied, the one or more constraints comprising:
   the normal vector $n_i$ of the plane on which the $i^{th}$ cross-section is located is at least approximately orthogonal to the normal vector $n_j$ of the plane on which the $j^{th}$ cross-section is located; and
   the tangent vector $t_{ij}$ to the $i^{th}$ cross-section at the cross-hair is at least approximately orthogonal to the tangent vector $t_{ji}$ to the $j^{th}$ cross-section at the cross-hair;

wherein, for each cross-hair comprising $i^{th}$ and $j^{th}$ intersecting cross-sections, the one or more constraints have a form:

$$x_x(n_i^x - n_j^x) + x_y(n_i^y - n_j^y) + (c_i - c_j) = 0$$

where:
   $x_x$ and $x_y$ are coordinates of the cross-hair in first and second directions parallel to a view plane of the concept drawing;
   $n_i^x$ and $n_j^x$ are magnitudes of the normal vectors of the $i^{th}$ and $j^{th}$ cross-sections, respectively, in the first direction;
   $n_i^y$ and $n_j^y$ are magnitudes of the normal vectors of the $i^{th}$ and $j^{th}$ cross-sections, respectively, in the second direction; and
   $c_i$ and $c_j$ are offset values representing locations of the planes on which the $i^{th}$ and $j^{th}$ cross-sections are located utilizing said three-dimensional vector field in the characterization of said three-dimensional object.

15. A computer-implemented method for characterizing a three-dimensional object underlying a two-dimensional concept drawing, the method comprising:

obtaining, at a computer system, a two-dimensional concept drawing comprising a two-dimensional computer representation of a three-dimensional object underlying the concept drawing, the concept drawing comprising a plurality of two-dimensional cross-sections which intersect at one or more cross-hairs and saving the two-dimensional concept drawing in a memory accessible to the computer system;

determining, by the computer system, a three-dimensional vector field computer representation corresponding to the three-dimensional object underlying the concept drawing and saving the three-dimensional vector field in the memory accessible to the computer system, the three-dimensional vector field comprising a plurality of three-dimensional vectors;

wherein determining the three-dimensional vector field comprises determining, by the computer system, for each cross-section:
   a corresponding plane on which the cross-section is located, the plane having a normal vector n in a three-dimensional coordinate system; and
   for each cross-hair on the cross-section, a tangent vector t in the three-dimensional coordinate system which is tangent to the cross-section at the cross-hair;

wherein, for each cross-hair comprising $i^{th}$ and $j^{th}$ intersecting cross-sections, one or more constraints are satisfied, the one or more constraints comprising:
   the normal vector $n_i$ of the plane on which the $i^{th}$ cross-section is located is at least approximately orthogonal to the normal vector $n_j$ of the plane on which the $j^{th}$ cross-section is located; and
   the tangent vector $t_{ij}$ to the $i^{th}$ cross-section at the cross-hair is at least approximately orthogonal to the tangent vector $t_{ji}$ to the $j^{th}$ cross-section at the cross-hair;

wherein determining the three-dimensional vector field further comprises:

for each cross-hair comprising $i^{th}$ and $j^{th}$ intersecting cross-sections, generating a corresponding cross-hair surface normal vector $n_{ij}$ characterizing a surface of an object underlying the concept drawing in the three-dimensional coordinate system, wherein generating the corresponding cross-hair surface normal vector is based on the tangent vector $t_{ij}$ to the $i^{th}$ cross-section at the cross-hair and the tangent vector $t_{ji}$ to the $j^{th}$ cross-section at the cross-hair; and propagating the cross-hair surface normal vectors by, for each cross-hair comprising $i^{th}$ and $j^{th}$ intersecting cross-sections, generating a plurality of cross-section surface normal vectors along at least a portion of the $i^{th}$ and $j^{th}$ cross-sections, the cross-section surface normal vectors based at least in part on one or more of: the corresponding cross-hair surface normal vector $n_{ij}$, the tangent vector $t_{ij}$ to the $i^{th}$ cross-section at the cross-hair and the tangent vector $t_{ji}$ to the $j^{th}$ cross-section at the cross-hair;

wherein generating the plurality of cross-section surface normal vectors comprises, at a location x away from a first cross-hair along a first cross-section intersecting the first cross-hair:
   determining a first tangent vector $t_{ax}$ tangent to the first cross-section at the location x and coplanar with the plane in which the first cross-section is located;
   determining a second tangent vector $t_{xa}$ at the location x based at least in part on a third tangent vector $t_{ba}$, the third tangent vector $t_{ba}$ tangent to a second cross-section intersecting with the first cross-section at the first cross-hair and coplanar with the plane in which the second cross-section is located; and
   generating a cross-section surface normal vector for the location x, the cross-section surface normal vector orthogonal to the first and second tangent vectors utilizing said three-dimensional vector field in the characterization of said three-dimensional object.

16. A computer-implemented method for characterizing a three-dimensional subject underlying a two-dimensional concept drawing, the method comprising:
- obtaining, at a computer system, a two-dimensional concept drawing comprising a two-dimensional computer representation of a three-dimensional object underlying the concept drawing, the concept drawing comprising a plurality of two-dimensional cross-sections which intersect at one or more cross-hairs and saving the two-dimensional concept drawing in a memory accessible to the computer system;
- determining, by the computer system, a three-dimensional vector field computer representation corresponding to the three-dimensional object underlying the concept drawing and saving the three-dimensional vector field in the memory accessible to the computer system, the three-dimensional vector field comprising a plurality of three-dimensional vectors;
- wherein determining the three-dimensional vector field comprises determining, by the computer system, for each cross-section:
  - a corresponding plane on which the cross-section is located, the plane having a normal vector n in a three-dimensional coordinate system; and
  - for each cross-hair on the cross-section, a tangent vector t in the three-dimensional coordinate system which is tangent to the cross-section at the cross-hair;
- wherein, for each cross-hair comprising $i^{th}$ and $j^{th}$ intersecting cross-sections, one or more constraints are satisfied, the one or more constraints comprising:
  - the normal vector $n_i$ of the plane on which the $i^{th}$ cross-section is located is at least approximately orthogonal to the normal vector $n_j$ of the plane on which the $j^{th}$ cross-section is located; and
  - the tangent vector $t_{ij}$ to the $i^{th}$ cross-section at the cross-hair is at least approximately orthogonal to the tangent vector $t_{ji}$ to the $j^{th}$ cross-section at the cross-hair;
- wherein determining the three-dimensional vector field further comprises:
- for each cross-hair comprising $i^{th}$ and $j^{th}$ intersecting cross-sections, generating a corresponding cross-hair surface normal vector $n_{ij}$ characterizing a surface of an object underlying the concept drawing in the three-dimensional coordinate system, wherein generating the corresponding cross-hair surface normal vector is based on the tangent vector $t_{ij}$ to the $i^{th}$ cross-section at the cross-hair and the tangent vector $t_{ji}$ to the $j^{th}$ cross-section at the cross-hair;
- defining one or more regions of the concept drawing, each of the regions bounded by a plurality of curves, each curve being one of: a cross-section and a boundary curve; and
- propagating the cross-hair surface normal vectors to an interior of the one or more regions utilizing said three-dimensional vector field in the characterization of said three-dimensional object.

17. A computer program product comprising a set of instructions embodied on a non-transitory computer readable medium, the instructions when executed by a processor, cause the processor to perform the steps of method 1.

18. A computer-implemented system for characterizing an arbitrary three-dimensional object underlying a two-dimensional concept drawing, the system comprising a processor in communication with a memory, the processor operable to:
- obtain as input a two-dimensional concept drawing comprising a two-dimensional computer representation of an arbitrary three-dimensional object underlying the concept drawing, the concept drawing comprising as input a plurality of non-parallel two-dimensional cross-sections which intersect at one or more cross-hairs and save the two-dimensional concept drawing in the memory;
- determine a three-dimensional vector field computer representation corresponding to the arbitrary three-dimensional object underlying the concept drawing and saving the three-dimensional vector field in the memory, the three-dimensional vector field comprising a plurality of three-dimensional vectors;
- wherein determining the three-dimensional vector field comprises:
  - the processor determining, for each cross-section:
    - a corresponding plane on which the cross-section is located, the plane having a normal vector n in a three-dimensional coordinate system; and
    - for each cross-hair on the cross-section, a tangent vector t in the three-dimensional coordinate system which is tangent to the cross-section at the cross-hair;
- wherein, for each cross-hair comprising $i^{th}$ and $j^{th}$ intersecting cross-sections, one or more constraints are satisfied, the one or more constraints comprising:
  - the normal vector $n_i$ of the plane on which the $i^{th}$ cross-section is located is at least approximately orthogonal to the normal vector $n_j$ of the plane on which the $j^{th}$ cross-section is located; and
  - the tangent vector $t_{ij}$ to the $i^{th}$ cross-section at the cross-hair is at least approximately orthogonal to the tangent vector $t_{ji}$ to the $j^{th}$ cross-section at the cross-hair utilizing said three-dimensional vector field in the characterization of said three-dimensional object.

19. A computer-implemented method for generating a three-dimensional normal vector field that represents a surface of an arbitrary object underlying a concept drawing, the method comprising:
- obtaining, as input at a computer system, a two-dimensional concept drawing comprising a two-dimensional computer representation of an arbitrary three-dimensional object underlying the concept drawing, the concept drawing comprising a plurality of non-parallel two-dimensional cross-sections which intersect at one or more cross-hairs and saving the two-dimensional concept drawing in a memory accessible to the computer system;
- determining, by the computer system, a three-dimensional normal vector field that represents a surface of the arbitrary object underlying the concept drawing in a three-dimensional coordinate system and saving the three-dimensional normal vector field in the memory accessible to the computer system, the three-dimensional normal vector field comprising a plurality of three-dimensional vectors to the surface of the arbitrary object underlying the concept drawing in the three-dimensional coordinate system;
- wherein determining the three-dimensional normal vector field comprises:
  - performing, at the computer system, a constrained optimization which minimizes an objective function subject to one or more constraints to solve for: a plurality of cross-section normal vectors, each cross-section normal vector $n_i$ corresponding to an $i^{th}$ one of the cross-sections and normal to an $i^{th}$ plane defined in the three-dimensional coordinate system and such that the $i^{th}$ plane includes the $i^{th}$ one of the cross-sections; a plurality of tangent vectors in the three-dimensional coordinate system, each tangent vector $t_{ij}$ corresponding to an $ij^{th}$ one of the cross-hairs and comprising a tangent to the $i^{th}$ one of the cross-sections at a location, in the three-dimensional coordinate system, of the $ij^{th}$ cross-hair where the $i^{th}$ one of the cross-sections intersects the $j^{th}$ one of the cross-sections; and a plurality of offset values, each offset value $c_j$ representing a location of the $i^{th}$ plane in the three-dimensional coordinate system;

generating, at the computer system, the three-dimensional normal vector field comprising a plurality of cross-hair surface normal vectors in the three-dimensional coordinate system, each cross-hair surface normal vector $n_{ij}$ located at the location, in the three-dimensional coordinate system, of the $i^{th}$ cross-hair where the $i^{th}$ one of the cross-sections intersects the $j^{th}$ one of the cross-sections and oriented orthogonally to the surface of the object underlying the concept drawing at the location of the $ij^{th}$ cross-hair, wherein generating the plurality of cross-hair surface normal vectors is based at least in part on one or more of: the plurality of cross-section normal vectors, the plurality of tangent vectors and the plurality of offset values utilizing said three-dimensional vector field in the characterization of said three-dimensional object.

20. A method according to claim 19 comprising propagating, by the computer system, the cross-hair surface normal vectors to locations away from the cross-hairs to further populate the three-dimensional normal vector field at locations away from the cross-hairs.

* * * * *